United States Patent
Kurasawa et al.

(10) Patent No.: US 10,296,156 B2
(45) Date of Patent: **\*May 21, 2019**

(54) TOUCH DETECTION DEVICE, DISPLAY DEVICE WITH TOUCH DETECTING FUNCTION, AND ELECTRONIC APPARATUS

(71) Applicant: Japan Display Inc., Tokyo (JP)

(72) Inventors: Hayato Kurasawa, Tokyo (JP); Yasuyuki Teranishi, Tokyo (JP); Yoshitoshi Kida, Tokyo (JP)

(73) Assignee: Japan Display Inc., Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 16/107,391

(22) Filed: Aug. 21, 2018

(65) Prior Publication Data

US 2018/0356918 A1 Dec. 13, 2018

Related U.S. Application Data

(63) Continuation of application No. 14/150,309, filed on Jan. 8, 2014, now Pat. No. 10,095,359.

(30) Foreign Application Priority Data

Jan. 10, 2013 (JP) .................................. 2013-003006

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04103* (2013.01)

(58) Field of Classification Search
CPC combination set(s) only.
See application file for complete search history.

(56) References Cited

U.S. PATENT DOCUMENTS

| | | | |
|---|---|---|---|
| 2010/0026660 A1\* | 2/2010 | Kitamura | G06F 3/044 345/174 |
| 2010/0231531 A1 | 9/2010 | Yang | |

(Continued)

FOREIGN PATENT DOCUMENTS

| | | |
|---|---|---|
| JP | 2010-039602 | 2/2010 |
| JP | 2011-138154 | 7/2011 |

(Continued)

OTHER PUBLICATIONS

Japanese Office Action dated Mar. 15, 2016 in corresponding Japanese Application No. 2013-003006.

*Primary Examiner* — Nitin Patel
*Assistant Examiner* — Amen W Bogale
(74) *Attorney, Agent, or Firm* — K&L Gates LLP

(57) ABSTRACT

According to an aspect, a touch detection device includes a drive electrode layer including a plurality of drive electrodes formed in stripes in an array direction; a plurality of touch detection electrodes that are arranged in a manner facing the plurality of drive electrodes and generate capacitance with the plurality of drive electrodes; and a touch detecting unit that applies a touch drive signal to the plurality of drive electrodes and detects a position of an object in contiguity with a touch detection area based on detection signals supplied from the plurality of touch detection electrodes. The plurality of the drive electrodes include an end drive electrode that is provided to at least one end in the array direction and has a larger width in the array direction than the width in the array direction of drive electrodes other than the end drive electrode.

9 Claims, 17 Drawing Sheets

(56) References Cited

U.S. PATENT DOCUMENTS

| | | |
|---|---|---|
| 2010/0328239 A1 | 12/2010 | Harada et al. |
| 2011/0267293 A1* | 11/2011 | Noguchi ............... G06F 3/0416 |
| | | 345/173 |
| 2012/0050193 A1* | 3/2012 | Noguchi ............. G02F 1/13338 |
| | | 345/173 |
| 2012/0075238 A1 | 3/2012 | Minami et al. |
| 2012/0075239 A1 | 3/2012 | Azumi |
| 2012/0139848 A1 | 6/2012 | Lee |
| 2012/0262389 A1 | 10/2012 | Kida |
| 2013/0293484 A1 | 11/2013 | Singh |
| 2013/0299220 A1* | 11/2013 | Lee ......................... H05K 1/09 |
| | | 174/257 |
| 2013/0335365 A1 | 12/2013 | Kim |

FOREIGN PATENT DOCUMENTS

| | | |
|---|---|---|
| JP | 2012-043298 | 3/2012 |
| JP | 2012-068980 | 4/2012 |
| JP | 2012-73783 | 4/2012 |

* cited by examiner

543 DISPLAY UNIT
542 KEYBOARD
541 MAIN BODY

551 UPPER HOUSING
554 DISPLAY
553
552 LOWER HOUSING

TOUCH DETECTION DEVICE, DISPLAY DEVICE WITH TOUCH DETECTING FUNCTION, AND ELECTRONIC APPARATUS

CROSS REFERENCES TO RELATED APPLICATIONS

The present application is a continuation of U.S. patent application Ser. No. 14/150,309, filed on Jan. 8, 2014, which application claims priority to Japanese Priority Patent Application JP 2013-003006 filed in the Japan Patent Office on Jan. 10, 2013, the entire content of which is hereby incorporated by reference.

BACKGROUND

1. Technical Field

The present disclosure relates to a touch detection device capable of detecting an external contiguous object, a touch detecting display device with a touch detecting function provided with the same, and an electronic apparatus.

2. Description of the Related Art

Recently widely known is a display device with a touch detecting function including a touch detection device that detects a contiguity operation of an external contiguous object, such as a finger and a stylus pen. Such display device with a touch detecting function is called a touch panel. There have been developed a touch panel provided with a touch detecting unit on a display device, such as a liquid-crystal display device, and a touch panel provided with a touch detecting unit integrated with a display device, such as a liquid-crystal display device.

Some types of detection methods of touch detection devices are known, including optical detection type, resistive detection type, and capacitive detection type, for example. The capacitive touch detection device can be formed in a relatively simple structure and driven with low power consumption. The display device with a touch detecting function including such a touch detection device displays various types of button images and the like. A user performs a contiguity operation with an external contiguous object on the display device, thereby performing an input operation of desired information via a touch detecting unit in the same manner as in the case of typical mechanical buttons. Touch detection devices can be provided substantially integrally with display devices, unlike input devices, such as keyboards, mouses, and keypads, provided in a manner externally coupled to display devices. Thus, touch detection devices are provided to various types of electronic apparatuses, such as mobile phones, television receivers, digital cameras, and notebook personal computers.

In a capacitive touch detection device, a first wiring and a second wiring are laminated. The capacitive touch detection device applies a voltage to one of the wirings (a drive electrode) and detects a detection signal with the other of the wirings (a touch detection electrode) (refer to Japanese Patent Application Laid-open Publication No. 2012-43298 (JP-A-2012-43298)). In the capacitive touch detection device, the value of the signal detected in touch detection changes when an external contiguous object is in contiguous with a detection area in which touch detection is performed by the drive electrode and the touch detection electrode. Based on the change, the capacitive touch detection device detects contiguity of the external contiguous object. JP-A-2012-43298 also discloses a technology for causing the width of a pad at the end of the drive electrode to vary depending on the position.

In the touch detection device, a plurality of drive electrodes are arranged side by side in a predetermined direction (an array direction). In other words, the touch detection device is formed of the drive electrodes aligned in the array direction. To detect a touch, the touch detection device changes a drive electrode to which a voltage is applied by time division and detects a signal with the touch detection electrode at each detection timing. If a touch is being made in an area in which the drive electrode is arranged, the touch detection electrode overlapping with the drive electrode near the touch position detects a change in the signal. The touch detection device detects the touch position based on the change in the signal. The touch detection device performs interpolation of the touch position based on signals detected when a voltage is applied to adjacent drive electrodes, that is, signals detected at each position of the adjacent drive electrodes. Thus, the touch detection device detects the touch position at a higher resolution than the arrangement density of the drive electrodes.

In the touch detection device, a drive electrode positioned at an end in the array direction has no adjacent drive electrode arranged on one side thereof in the array direction. If a signal is detected at a detection timing when a voltage is applied to the drive electrode positioned at the end in the array direction, interpolation is performed on the signal only with a signal detected at a detection timing when a voltage is applied to an adjacent drive electrode arranged on the other side thereof in the array direction. This reduces the accuracy of the interpolation at the position compared with the other positions.

For the foregoing reasons, there is a need for a touch detection device that is capable of enhancing the detection accuracy of a touch, a display device with a touch detection function provided the same, and an electronic apparatus.

SUMMARY

According to an aspect, a touch detection device includes a drive electrode layer including a plurality of drive electrodes formed in stripes in an array direction; a plurality of touch detection electrodes that are arranged in a manner facing the plurality of drive electrodes and generate capacitance with the plurality of drive electrodes; and a touch detecting unit that applies a touch drive signal to the plurality of drive electrodes and detects a position of an object in contiguity with a touch detection area provided with the plurality of drive electrodes and the plurality of touch detection electrodes based on detection signals supplied from the plurality of touch detection electrodes. The plurality of the drive electrodes of the drive electrode layer include an end drive electrode that is provided to at least one end in the array direction and has a larger width in the array direction than the width in the array direction of drive electrodes other than the end drive electrode.

According to another aspect, a display device with a touch detecting function has a touch detection device and a display device arranged in a manner overlapping with the touch detection device. The touch detection device includes a drive electrode layer including a plurality of drive electrodes formed in stripes in an array direction; a plurality of touch detection electrodes that are arranged in a manner facing the plurality of drive electrodes and generate capacitance with the plurality of drive electrodes; and a touch detecting unit that applies a touch drive signal to the plurality of drive electrodes and detects a position of an object in contiguity with a touch detection area provided with the plurality of drive electrodes and the plurality of touch detection electrodes based on detection signals supplied from the plurality of touch detection electrodes. The plurality of the drive electrodes of the drive electrode layer include an end drive electrode that is provided to at least one end in the array direction and has a larger width in the array direction than the width in the array direction of drive electrodes other than the end drive electrode.

According to another aspect, an electronic apparatus has the display device with a touch detecting function that has a touch detection device and a display device arranged in a manner overlapping with the touch detection device. The touch detection device includes a drive electrode layer including a plurality of drive electrodes formed in stripes in an array direction; a plurality of touch detection electrodes that are arranged in a manner facing the plurality of drive electrodes and generate capacitance with the plurality of drive electrodes; and a touch detecting unit that applies a touch drive signal to the plurality of drive electrodes and detects a position of an object in contiguity with a touch detection area provided with the plurality of drive electrodes and the plurality of touch detection electrodes based on detection signals supplied from the plurality of touch detection electrodes. The plurality of the drive electrodes of the drive electrode layer include an end drive electrode that is provided to at least one end in the array direction and has a larger width in the array direction than the width in the array direction of drive electrodes other than the end drive electrode.

Additional features and advantages are described herein, and will be apparent from the following Detailed Description and the figures.

DETAILED DESCRIPTION

Embodiments according to the present disclosure are described in detail with reference to the accompanying drawings. The contents disclosed in the embodiments are not intended to limit the present disclosure. Components described below include components easily conceivable by those skilled in the art and components substantially identical. The components described below can be combined as appropriate. The explanation will be made in the following order.

Figure 1:
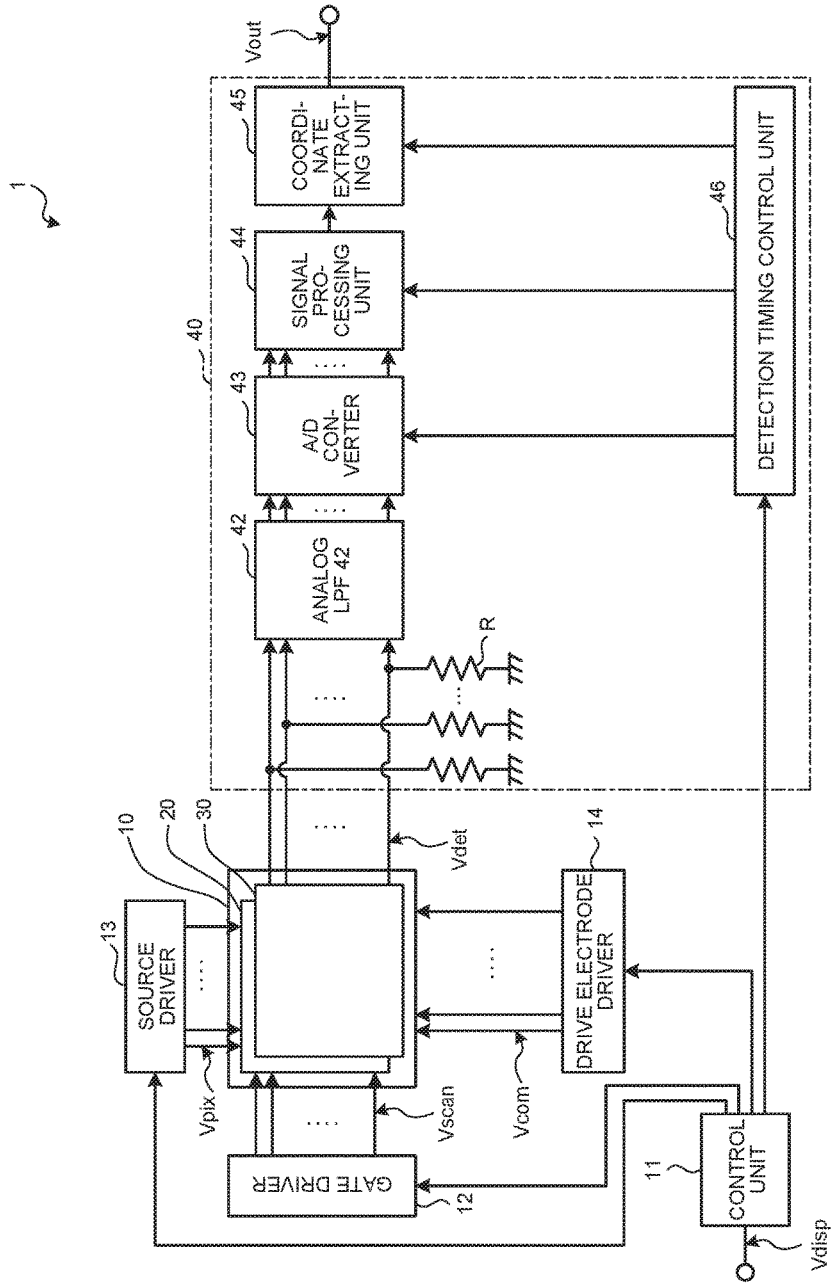
FIG. 1 is a block diagram of an exemplary configuration of a display device with a touch detecting function according to a first embodiment.

1. Embodiments (display device with a touch detecting function)
   1-1. First Embodiment
   1-2. Second Embodiment
2. Application Examples (electronic apparatuses)
   Examples in which the display devices with a touch detecting function according to the embodiments are applied to electronic apparatuses
3. Aspects of the Present Disclosure
1. Embodiments
1-1. First Embodiment
1-1A. Exemplary Configuration
Exemplary Entire Configuration FIG. 1 is a block diagram of an exemplary configuration of a display device with a touch detecting function according to a first embodiment. A display device 1 with a touch detecting function, includes a display unit 10 with a touch detecting function, a control unit 11, a gate driver 12, a source driver 13, a drive electrode driver 14, and a touch detecting unit 40. In the display device 1 with a touch detecting function, the display unit 10 with a touch detecting function has a touch detecting function. The display unit 10 with a touch detecting function is what is called an in-cell type device in which a liquid-crystal display unit (display device) 20 using liquid-crystal display elements as display elements is integrated with a capacitive touch detecting device (touch detection device) 30. The display unit 10 with a touch detecting function may be what is called an on-cell type device in which the capacitive touch detecting device 30 is mounted on the liquid-crystal display unit 20 using liquid-crystal display elements as display elements.

The liquid-crystal display unit 20 performs sequential scanning on each horizontal line based on a scanning signal Vscan supplied from the gate driver 12, thereby performing display, which will be described later. The control unit 11 is a circuit that supplies control signals to the gate driver 12, the source driver 13, the drive electrode driver 14, and the touch detecting unit 40 based on a video signal Vdisp supplied from the outside, thereby controlling these components so as to operate in synchronization with one another.

The gate driver 12 has a function to sequentially select a horizontal line to be a target of display drive of the display unit 10 with a touch detecting function based on the control signal supplied from the control unit 11.

The source driver 13 is a circuit that supplies a pixel signal Vpix to each pixel Pix (sub-pixel SPix), which will be described later, of the display unit 10 with a touch detecting function based on the control signal supplied from the control unit 11. The source driver 13 generates a pixel signal by time-division multiplexing the pixel signals Vpix of a plurality of sub-pixels SPix of the liquid-crystal display unit 20 from a video signal of a horizontal line.

The drive electrode driver 14 is a circuit that supplies a drive signal Vcom to a drive electrode COML, which will be described later, of the display unit 10 with a touch detecting function based on the control signal supplied from the control unit 11.

Basic Principle of Capacitive Touch Detection

Figure 2:
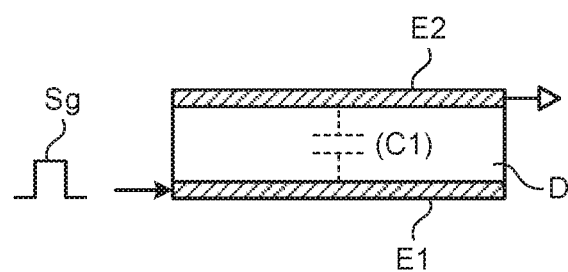
FIG. 2 is a view illustrating a state where no finger is in contact or in contiguity with a device for explanation of the basic principle of a capacitive touch detection method.
Figure 3:
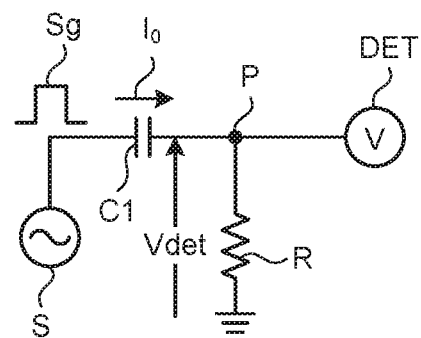
FIG. 3 is a view for explaining an example of an equivalent circuit in the state where no finger is in contact or in contiguity illustrated in FIG. 2.
Figure 4:
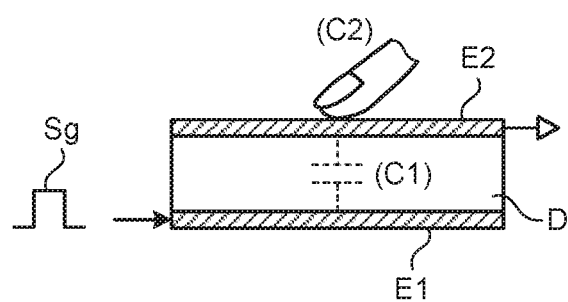
FIG. 4 is a view illustrating a state where a finger is in contact or in contiguity with a device for explanation of the basic principle of the capacitive touch detection method.
Figure 5:
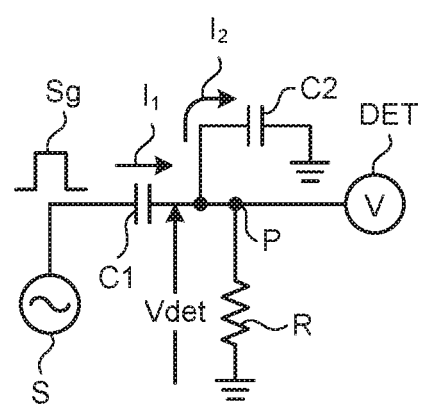
FIG. 5 is a view for explaining an example of the equivalent circuit in the state where the finger is in contact or in contiguity illustrated in FIG. 4.
Figure 6:
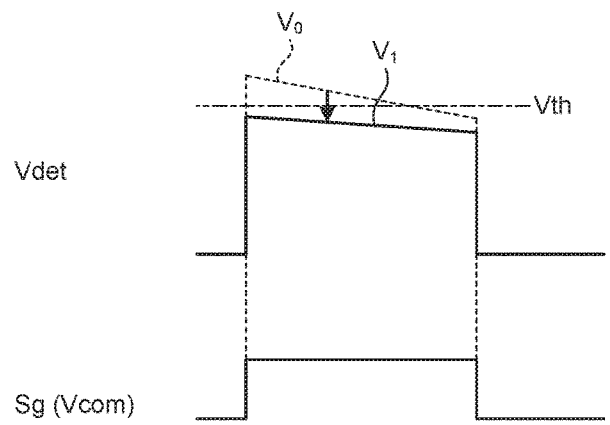
FIG. 6 is a schematic of an example of a waveform of a drive signal and a touch detection signal.

The touch detecting device 30 operates based on the basic principle of capacitive touch detection, thereby outputting a touch detection signal Vdet. The following describes the basic principle of touch detection in the display device with a touch detecting function according to the present embodiment with reference to FIG. 1 to FIG. 6. FIG. 2 is a view illustrating a state where no finger is in contact or in contiguity with a device for explanation of the basic principle of a capacitive touch detection method. FIG. 3 is a view for explaining an example of an equivalent circuit in the state where no finger is in contact or in contiguity illustrated in FIG. 2. FIG. 4 is a view illustrating a state where a finger is in contact or in contiguity with a device for explanation of the basic principle of the capacitive touch detection method. FIG. 5 is a view for explaining an example of the equivalent circuit in the state where the finger is in contact or in contiguity illustrated in FIG. 4.

As illustrated in FIG. 2 and FIG. 4, a capacitive element C1 includes a pair of electrodes of a drive electrode E1 and a touch detection electrode E2 arranged in a manner facing each other with a dielectric D interposed therebetween, for example. As illustrated in FIG. 3 and FIG. 5, a first end of the capacitive element C1 is coupled to an alternating-current (AC) signal source (a drive signal source) S, whereas a second end P is grounded via a resistance R and is coupled to a voltage detector (a touch detector) DET.

When the AC signal source S applies an AC rectangular wave Sg at a predetermined frequency (e.g., approximately several kilohertz to several hundred kilohertz) to the drive electrode E1 (the first end of the capacitive element C1), an output waveform (touch detection signal Vdet) is generated at the touch detection electrode E2 (the second end P of the capacitive element C1). The AC rectangular wave Sg corresponds to a touch drive signal Vcomt, which will be described later.

In the state where no finger is in contact (or in contiguity) (a non-contact state) with a device, an electric current $I_0$ depending on the capacitance value of the capacitive element C1 flows in association with charge and discharge to the capacitive element C1 as illustrated in FIG. 2 and FIG. 3. The potential waveform at the second end P of the capacitive element C1 is a waveform $V_0$ illustrated in FIG. 6, for example. The voltage detector DET illustrated in FIG. 3 detects the waveform $V_0$.

By contrast, in the state where a finger is in contact (or in contiguity) (a contact state) with a device, capacitance generated by the finger acts like a capacitive element C2 added to the capacitive element C1 as illustrated in FIG. 4. In the equivalent circuit illustrated in FIG. 5, the capacitive element C2 is added to the capacitive element C1 in series. In this state, electric currents $I_1$ and $I_2$ flow through the capacitive elements C1 and C2, respectively, in association with charge and discharge to the capacitive elements C1 and C2. The potential waveform at the second end P of the capacitive element C1 is a waveform $V_1$ illustrated in FIG. 6, for example. The voltage detector DET detects the waveform $V_1$. The potential at the second end P is a divided voltage potential determined depending on the values of the electric currents $I_1$ and $I_2$ flowing through the capacitive elements C1 and C2, respectively. As a result, the waveform $V_1$ is smaller than the waveform $V_0$ generated in the non-contact state. The voltage detector DET compares a detected voltage with a predetermined threshold voltage Vth. If the detected voltage is equal to or larger than the threshold voltage, the voltage detector DET determines that it is the non-contact state. By contrast, if the detected voltage is smaller than the threshold voltage Vth, the voltage detector DET determines that it is the contact state. Thus, the touch detection is performed.

The touch detecting device 30 illustrated in FIG. 1 performs sequential scanning on each detection block based on the drive signal Vcom (touch drive signal Vcomt, which will be described later) supplied from the drive electrode driver 14, thereby performing touch detection.

The touch detecting device 30 outputs the touch detection signal Vdet for each detection block from a plurality of touch detection electrodes TDL, which will be described later, and supplies the touch detection signal Vdet to the touch detecting unit 40.

The touch detecting unit 40 is a circuit that detects whether a touch is made on the touch detecting device 30 (the contact state described above) based on the control signal supplied from the control unit 11 and the touch detection signal Vdet supplied from the touch detecting device 30 of the display unit 10 with a touch detecting function. If a touch is made, the touch detecting unit 40 derives the coordinates of the touch in the touch detection area. The touch detecting unit 40 includes an analog low pass filter (LPF) 42, an analog/digital (A/D) converter 43, a signal processing unit 44, a coordinate extracting unit 45, and a detection timing control unit 46.

The analog LPF 42 is a low-pass analog filter that receives the touch detection signal Vdet supplied from the touch detecting device 30, removes high-frequency components (noise components) included in the touch detection signal Vdet, and extracts and outputs touch components. A resistance R supplies a direct-current (DC) potential (0V) and is arranged between each input terminal of the analog LPF 42 and the ground. Instead of the resistance R, a switch may be provided, for example. In this case, the switch is turned ON at predetermined time, thereby supplying the DC potential (0V).

The A/D converter 43 is a circuit that samples the analog signal output from the analog LPF 42, thereby converting the analog signal into a digital signal in synchronization with the drive signal Vcom.

The signal processing unit 44 includes a digital filter. The digital filter removes high-frequency components (noise components) higher than the frequency at which the touch drive signal Vcomt is sampled in the output signal of the A/D converter 43, thereby extracting touch components. The signal processing unit 44 is a logic circuit that detects whether a touch is made on the touch detecting device 30 based on the output signal from the A/D converter 43.

The coordinate extracting unit 45 is a logic circuit that derives, when a touch is detected by the signal processing unit 44, the touch panel coordinates of the touch. The detection timing control unit 46 performs control such that the A/D converter 43, the signal processing unit 44, and the coordinate extracting unit 45 operate in synchronization with one another.

Module

Figure 7:
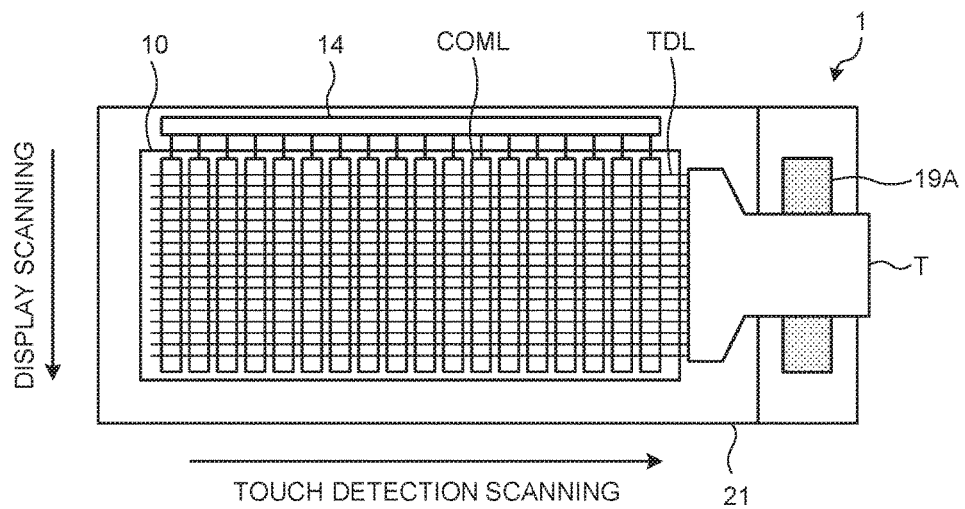
FIG. 7 is a schematic of an example of a module on which the display device with a touch detecting function is mounted.
Figure 8:
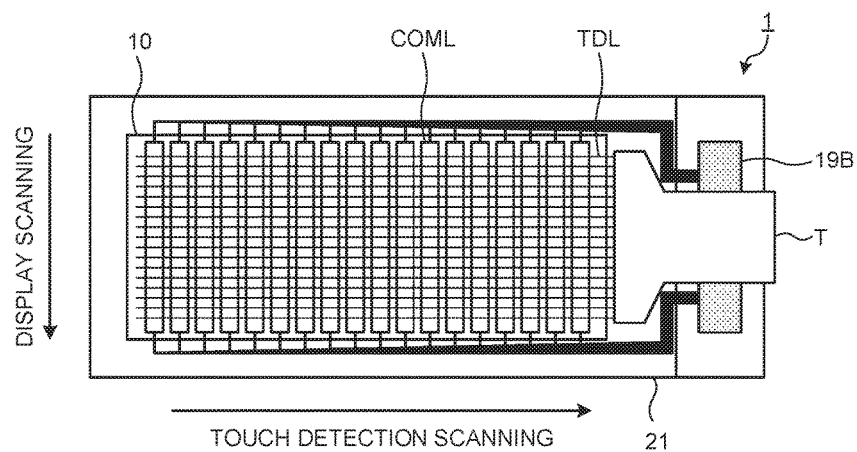
FIG. 8 is a schematic of another example of the module on which the display device with a touch detecting function is mounted.

FIGS. 7 and 8 are schematics of examples of a module on which the display device with a touch detecting function is mounted. To mount the display device 1 with a touch detecting function on the module, the drive electrode driver 14 may be formed on a TFT substrate 21, which is a glass substrate, as illustrated in FIG. 7.

As illustrated in FIG. 7, the display device 1 with a touch detecting function includes the display unit 10 with a touch detecting function, the drive electrode driver 14, and a chip on glass (COG) 19A. The display unit 10 with a touch detecting function is what is called a landscape (horizontally long) display unit. The display unit 10 with a touch detecting function schematically indicates the drive electrode COML and the touch detection electrode TDL formed to cross the drive electrode COML in a grand separated manner in a direction perpendicular to the surface of the TFT substrate, which will be described later. In other words, the drive electrodes COML are formed along the short-side direction of the display unit 10 with a touch detecting function, whereas the touch detection electrodes TDL are formed along the long-side direction of the display unit 10 with a touch detecting function. In the display unit 10 with a touch detecting function, a plurality of drive electrodes COML are arranged in a line in the long-side direction. The direction in which the drive electrodes COML are aligned, that is, the long-side direction of the display unit 10 with a touch detecting function corresponds to an array direction. In the display unit 10 with a touch detecting function, the drive electrodes COML are aligned in the array direction. The array direction corresponds to the short direction of the drive electrodes COML. In other words, a drive electrode COML and a drive electrode COML adjacent thereto are arranged side by side with their long sides facing each other. In the display unit 10 with a touch detecting function, the drive electrodes COML are arranged on a single plane. In the display unit 10 with a touch detecting function, the area in which the drive electrodes COML are arranged corresponds to a drive electrode layer. In the display unit 10 with a touch detecting function, a plurality of touch detection electrodes TDL are arranged in a line in the short-side direction. In the display unit 10 with a touch detecting function, the touch detection electrodes TDL are arranged on a single plane. In the display unit 10 with a touch detecting function, the area in which the touch detection electrodes TDL are arranged corresponds to a touch detection electrode layer. The drive electrode layer and the touch detection electrode layer are arranged at least throughout the area in which an image is displayed. The output side of the touch detection electrodes TDL is provided on the short side of the display unit 10 with a touch detecting function. The output side is coupled to the touch detecting device 40 mounted on the outside of the module via a terminal T formed of a flexible substrate or the like. The drive electrode driver 14 is formed on the TFT substrate 21, which is a glass substrate. The COG 19A is a chip mounted on the TFT substrate 21 and includes circuits required for a display operation, such as the control unit 11, the gate driver 12, and the source driver 13 illustrated in FIG. 1. The display device 1 with a touch detecting function may be provided with a COG 19B including the drive electrode driver 14 as illustrated in FIG. 8.

The module on which the display device 1 with a touch detecting function is mounted includes the COG 19B as illustrated in FIG. 8. The COG 19B illustrated in FIG. 8 includes the drive electrode driver 14 besides the circuits required for a display operation described above. The display device 1 with a touch detecting function performs line-sequential scanning on each horizontal line in the display operation, which will be described later. In other words, the display device 1 with a touch detecting function performs display scanning in a direction parallel to the short-side direction of the displaying device 10 with a touch detecting function. By contrast, the display device 1 with a touch detecting function sequentially applies the drive signal Vcom to the drive electrodes COML in a touch detection operation, thereby performing line-sequential scanning on each detection line. In other words, the display device 1 with a touch detecting function performs touch detection scanning in a direction parallel to the long-side direction of the displaying device 10 with a touch detecting function.

As described above, the display device 1 with a touch detecting function illustrated in FIG. 7 and FIG. 8 outputs the touch detection signal Vdet from the short side of the display unit 10 with a touch detecting function. As a result, the number of touch detection electrodes TDL can be reduced in the display device 1 with a touch detecting function. This facilitates routing of wiring to connect the display device 1 with a touch detecting function to the touch detecting unit 40 via the terminal T. Because the COG 19B includes the drive electrode driver 14, the display device 1 with a touch detecting function illustrated in FIG. 8 can have a smaller frame.

Display Unit 10 with a Touch Detecting Function

The following describes an exemplary configuration of the display unit 10 with a touch detecting function in detail.

Figure 9:
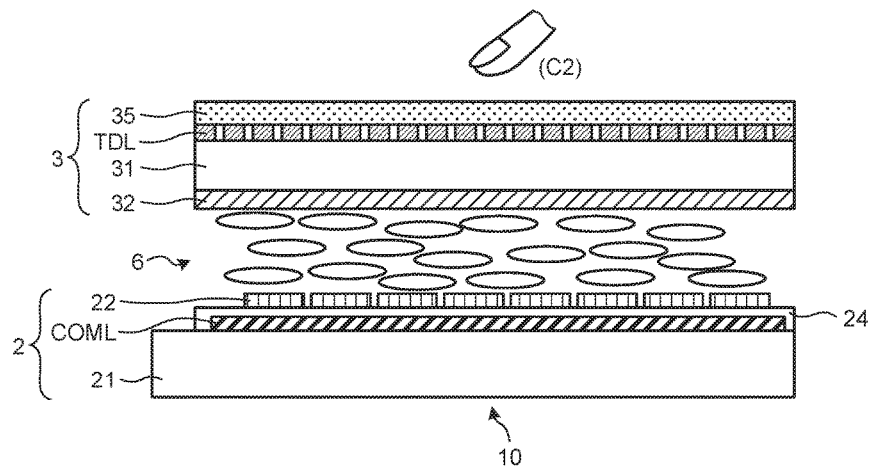
FIG. 9 is a sectional view of a schematic sectional structure of a display unit with a touch detecting function according to the first embodiment.
Figure 10:
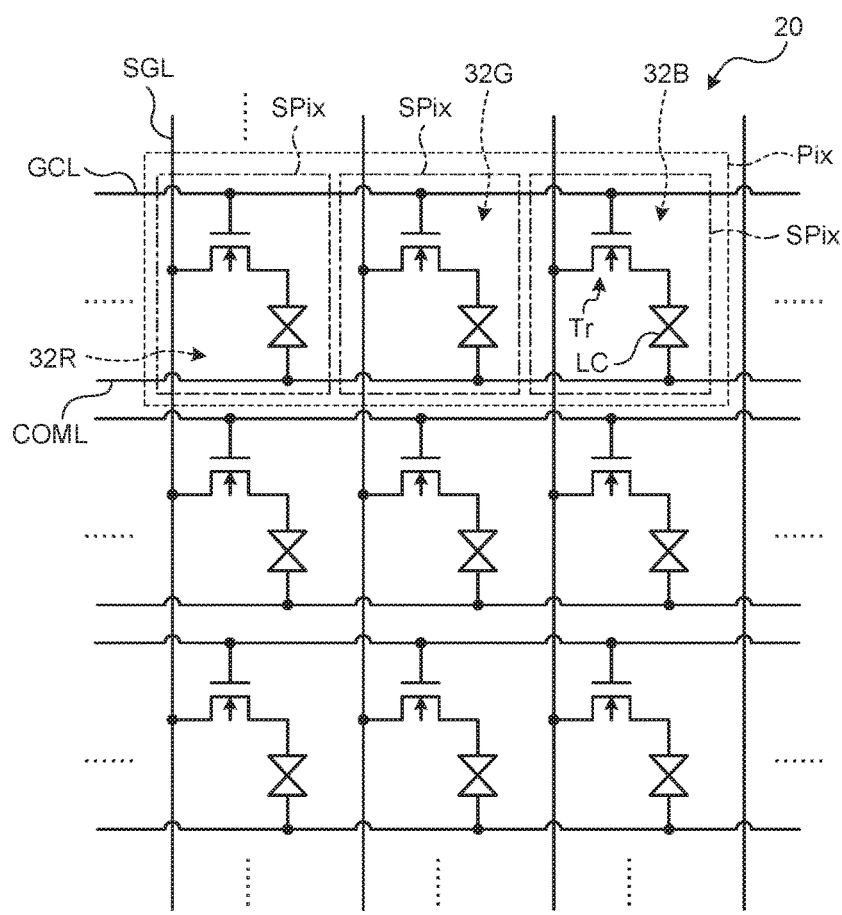
FIG. 10 is a circuit diagram of a pixel array of the display unit with a touch detecting function according to the first embodiment.

FIG. 9 is a sectional view of a schematic sectional structure of the display unit with a touch detecting function according to the first embodiment. FIG. 10 is a circuit diagram of a pixel array of the display unit with a touch detecting function according to the first embodiment. The display unit 10 with a touch detecting function includes a pixel substrate 2, a counter substrate 3, and a liquid-crystal layer 6. The counter substrate 3 is arranged in a manner facing the surface of the pixel substrate 2 in a perpendicular direction. The liquid-crystal layer 6 is inserted between the pixel substrate 2 and the counter substrate 3.

The pixel substrate 2 includes the TFT substrate 21, a plurality of pixel electrodes 22, a plurality of drive electrodes COML, and an insulation layer 24. The TFT substrate 21 serves as a circuit board. The pixel electrodes 22 are arranged in a matrix on the TFT substrate 21. The drive electrodes COML are formed between the TFT substrate 21 and the pixel electrodes 22. The insulation layer 24 provides electrical insulation between the pixel electrodes 22 and the drive electrodes COML. The TFT substrate 21 is provided with a thin-film transistor (TFT) element Tr of each sub-pixel SPix and wirings, such as a pixel signal line SGL and a scanning signal line GCL, as illustrated in FIG. 10. The pixel signal line SGL supplies the pixel signal Vpix to each pixel electrode 22, and the scanning signal line GCL drives each TFT element Tr. Thus, the pixel signal line SGL extends on a plane parallel to the surface of the TFT substrate 21 and supplies an image signal used to display an image to a pixel. The liquid-crystal display unit 20 illustrated in FIG. 10 includes a plurality of sub-pixels SPix arranged in a matrix. The sub-pixels Spix each include the TFT element Tr and a liquid-crystal element LC. The TFT element Tr is formed of a thin-film transistor, and specifically of an n-channel metal oxide semiconductor (MOS) TFT in this example. The source of the TFT element Tr is coupled to the pixel signal line SGL, the gate thereof is coupled to the scanning signal line GCL, and the drain thereof is coupled to a first end of the liquid-crystal element LC. The first end of the liquid-crystal element LC is coupled to the drain of the TFT element Tr, whereas a second end thereof is coupled to the drive electrode COML.

The sub-pixel SPix is coupled to other sub-pixels Spix belonging to the same row in the liquid-crystal display unit 20 by the scanning signal line GCL. The scanning signal line GCL is coupled to the gate driver 12 and is supplied with the scanning signal Vscan from the gate driver 12. The sub-pixel SPix is further coupled to other sub-pixels Spix belonging to the same column in the liquid-crystal display unit 20 by the pixel signal line SGL. The pixel signal line SGL is coupled to the source driver 13 and is supplied with the pixel signal Vpix from the source driver 13. The sub-pixel SPix is further coupled to the other sub-pixels Spix belonging to the same row in the liquid-crystal display unit 20 by the drive electrode COML. The drive electrode COML is coupled to the drive electrode driver 14 and is supplied with the drive signal Vcom from the drive electrode driver 14. In other words, a plurality of sub-pixels SPix belonging to the same row share one drive electrode COML in this example.

The gate driver 12 illustrated in FIG. 1 applies the scanning signal Vscan to the gate of the TFT element Tr of the sub-pixel SPix via the scanning signal line GCL illustrated in FIG. 10. Thus, the gate driver 12 sequentially selects a row (a horizontal line) out of the sub-pixels SPix arranged in a matrix in the liquid-crystal display unit 20 as a target of display drive. The source driver 13 illustrated in FIG. 1 supplies the pixel signal Vpix to the sub-pixels SPix constituting the horizontal line sequentially selected by the gate driver 12 via the pixel signal line SGL illustrated in FIG. 10. These sub-pixels SPix perform display of the horizontal line based on the pixel signal Vpix thus supplied. The drive electrode driver 14 illustrated in FIG. 1 applies the drive signal Vcom, thereby driving the drive electrode COML corresponding to the horizontal line illustrated in FIG. 9 and FIG. 10.

As described above, the gate driver 12 drives so as to perform time-division line-sequential scanning on the scanning signal line GCL, whereby the liquid-crystal display unit 20 sequentially selects a horizontal line. The source driver 13 supplies the pixel signal Vpix to the pixels Pix belonging to the horizontal line, whereby the liquid-crystal display unit 20 performs display of the horizontal line. To perform the display operation, the drive electrode driver 14 applies the drive signal Vcom to blocks including the drive electrode COML corresponding to the horizontal line.

The counter substrate 3 includes a glass substrate 31 and a color filter 32 formed on a first surface of the glass substrate 31. The touch detection electrode TDL serving as the detection electrode of the touch detecting device 30 is formed on a second surface of the glass substrate 31. A polarization plate 35 is provided on the touch detection electrode TDL.

The color filter 32 includes color areas 32R, 32G, and 32B colored with three colors of red (R), green (G), and blue (B), respectively. The color filter 32 faces the drive electrodes COML in a direction perpendicular to the TFT substrate 21 and overlaps with the drive electrodes COML in a direction perpendicular to the surface of the TFT substrate 21. In the color filter 32, color filters colored with the three colors of red (R), green (G), and blue (B) are periodically arranged, thereby associating the sub-pixels SPix illustrated in FIG. 10 with the color areas 32R, 32G, and 32B colored with the three colors of red (R), green (G), and blue (B), respectively. In addition, the color areas 32R, 32G, and 32B are associated with the pixel Pix as a group. The color filter 32 faces the liquid-crystal layer 6 in the direction perpendicular to the TFT substrate 21. The color filter 32 may have another color combination as long as the color filters are colored with different colors from each other.

The drive electrode COML according to the embodiment functions as a common electrode (a common drive electrode) of the liquid-crystal display unit 20 and as a drive electrode of the touch detecting device 30. In the embodiment, one drive electrode COML is arranged in a manner corresponding to the pixel electrodes 22 of a plurality of horizontal lines (pixel electrodes 22 constituting a plurality of rows). The insulation layer 24 provides electrical insulation between the pixel electrodes 22 and the drive electrodes COML and between the pixel electrodes 22 and the pixel signal lines SGL formed on the surface of the TFT substrate 21. The drive electrodes COML face the pixel electrodes 22 in the direction perpendicular to the surface of the TFT substrate 21. The drive electrodes COML extend in a direction parallel to the direction in which the scanning signal lines GCL extend. The drive electrode driver 14 applies the drive signal Vcom in an AC rectangular waveform to the drive electrode COML via a contact conductive pillar having electrical conductivity, which is not illustrated.

The liquid-crystal layer 6 modulates light passing therethrough depending on the state of an electric field. The liquid-crystal layer 6 is a liquid-crystal display unit using a lateral electric-field mode liquid crystal, such as fringe field switching (FFS) mode and in-plane switching (IPS) mode. An orientation film may be provided between the liquid-crystal layer 6 and the pixel substrate 2 and between the liquid-crystal layer 6 and the counter substrate 3 illustrated in FIG. 9.

An orientation film may be provided between the liquid-crystal layer 6 and the pixel substrate 2 and between the liquid-crystal layer 6 and the counter substrate 3. An incident-side polarization plate may be arranged on the lower surface of the pixel substrate 2.

Figure 11:
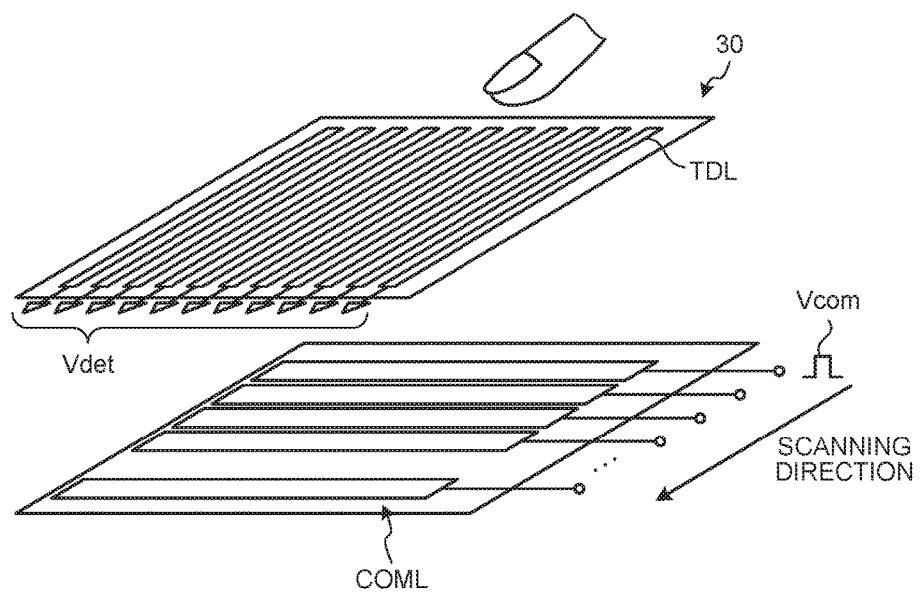
FIG. 11 is a perspective view of an exemplary configuration of drive electrodes and touch detection electrodes of the display unit with a touch detecting function according to the first embodiment.

FIG. 11 is a perspective view of an exemplary configuration of the drive electrodes and the touch detection electrodes of the display unit with a touch detecting function according to the first embodiment. The touch detecting device 30 is formed of the drive electrodes COML and the touch detection electrodes TDL provided to the counter electrode 3. The drive electrodes COML extend in the horizontal direction of FIG. 11 and are arranged in a stripe shape (electrode pattern) as described above. In the touch detecting device 30, the drive electrodes COML are arranged side by side in a line in the vertical direction of FIG. 11 as described above. In the touch detecting device 30, the drive electrodes COML arranged in a line divide an area to detect a touch into a plurality of sections. To perform a touch detection operation, the drive electrode driver 14 sequentially supplies the drive signal Vcom to the drive electrodes COML, thereby carrying out time-division line-sequential scanning drive, which will be described later. The touch detection electrodes TDL extend in a direction intersecting with the extending direction of the drive electrodes COML and are arranged in a stripe shape (electrode pattern). In the touch detecting device 30, the touch detection electrodes TDL are arranged side by side in a line in the horizontal direction of FIG. 11 as described above. In the touch detecting device 30, the touch detection electrodes TDL arranged in a line divide an area to detect a touch into a plurality of sections. The touch detection electrodes TDL face the drive electrodes COML in the direction perpendicular to the surface of the TFT substrate 21. The touch detection electrodes TDL are coupled to the input side of the analog LPF 42 of the touch detecting unit 40. The electrode patterns of the drive electrodes COML and the touch detection electrodes TDL intersecting with each other generate capacitance at the intersections.

In the touch detecting device 30, the drive electrode driver 14 drives to perform time-division line-sequential scanning on the drive electrodes COML in a touch detection operation, thereby sequentially selecting the drive electrodes COML arranged in a line. The touch detection electrode TDL then outputs the touch detection signal Vdet, thereby performing touch detection in one drive electrode COML. In other words, the drive electrode COML corresponds to the drive electrode E1 in the basic principle of touch detection described above, whereas the touch detection electrode TDL corresponds to the touch detection electrode E2. In accordance with the basic principle, the touch detecting device 30 detects a touch. As illustrated in FIG. 11, the electrode patterns intersecting with each other form a capacitance touch sensor in a matrix. Scanning the entire touch detection surface of the touch detecting device 30 enables detection of a position where an external contiguous object is in contact or in contiguity.

The TFT substrate 21 corresponds to a specific example of a "substrate" in the present disclosure. The pixel electrode 22 corresponds to a specific example of a "pixel electrode" in the present disclosure. The pixel signal line SGL corresponds to a specific example of a "signal line" in the present disclosure. The drive electrode COML corresponds to a specific example of a "drive electrode" in the present disclosure. The liquid-crystal element LC corresponds to a specific example of a "display functional layer" in the present disclosure. The source driver 13 and the drive electrode driver 14 correspond to specific examples of a "scanning drive unit" in the present disclosure. The touch detecting unit 40 corresponds to a specific example of a "detection processing unit" in the present disclosure. The touch detection electrode TDL corresponds to a specific example of a "touch detection electrode" in the present disclosure. The color filter 32 corresponds to a specific example of a "color filter" in the present disclosure.

1-1B. Operation and Action

The following describes an operation and action of the display device 1 with a touch detecting function according to the first embodiment.

The drive electrode COML functions as a common drive electrode of the liquid-crystal display unit 20 and as a drive electrode of the touch detecting device 30. As a result, the drive signal Vcom may possibly affect both the liquid-crystal display unit 20 and the touch detecting device 30. To address this, the drive signal Vcom is applied to the drive electrode COML separately in a display period B to perform a display operation and in a touch detection period A to perform a touch detection operation. The drive electrode driver 14 applies the drive signal Vcom as a display drive signal in the display period B to perform a display operation. The drive electrode driver 14 applies the drive signal Vcom as a touch drive signal in the touch detection period A to perform a touch detection operation. In the description below, the drive signal Vcom serving as the display drive signal is referred to as a display drive signal Vcomd, whereas the drive signal Vcom serving as the touch drive signal is referred to as a touch drive signal Vcomt.

Outline of the Entire Operation

Based on the video signal Vdisp supplied from the outside, the control unit 11 supplies control signals to the gate driver 12, the source driver 13, the drive electrode driver 14, and the touch detecting unit 40, thereby controlling these components so as to operate in synchronization with one another. The gate driver 12 supplies the scanning signal Vscan to the liquid-crystal display unit 20 in the display period B, thereby sequentially selecting a horizontal line to be a target of display drive. The source driver 13 supplies the pixel signal Vpix to each pixel Pix constituting the horizontal line selected by the gate driver 12 in the display period B.

In the display period B, the drive electrode driver 14 applies the display drive signal Vcomd to the drive electrode relating to the horizontal line. In the touch detection period A, the drive electrode driver 14 sequentially applies the touch drive signal Vcomt at a frequency higher than that of the display drive signal Vcomd to the drive electrodes relating to a touch detection operation, thereby sequentially selecting the drive electrodes. The display unit 10 with a touch detecting function performs a display operation based on the signals supplied from the gate driver 12, the source driver 13, and the drive electrode driver 14 in the display period B. The display unit 10 with a touch detecting function performs a touch detection operation based on the signal supplied from the drive electrode driver 14 and outputs the touch detection signal Vdet from the touch detection electrode TDL in the touch detection period A. The analog LPF 42 amplifies and outputs the touch detection signal Vdet. The A/D converter 43 converts the analog signal output from the analog LPF 42 into a digital signal in synchronization with the touch drive signal Vcomt. The signal processing unit 44 detects whether a touch is made on the touch detecting device 30 based on the output signal from the A/D converter 43. The coordinate extracting unit 45 derives, when a touch is detected by the signal processing unit 44, the touch panel coordinates of the touch and outputs an output signal Vout. The control unit 11 controls the detection timing control unit 46 to change the sampling frequency of the touch drive signal Vcomt.

Specific Operation

Figure 12:
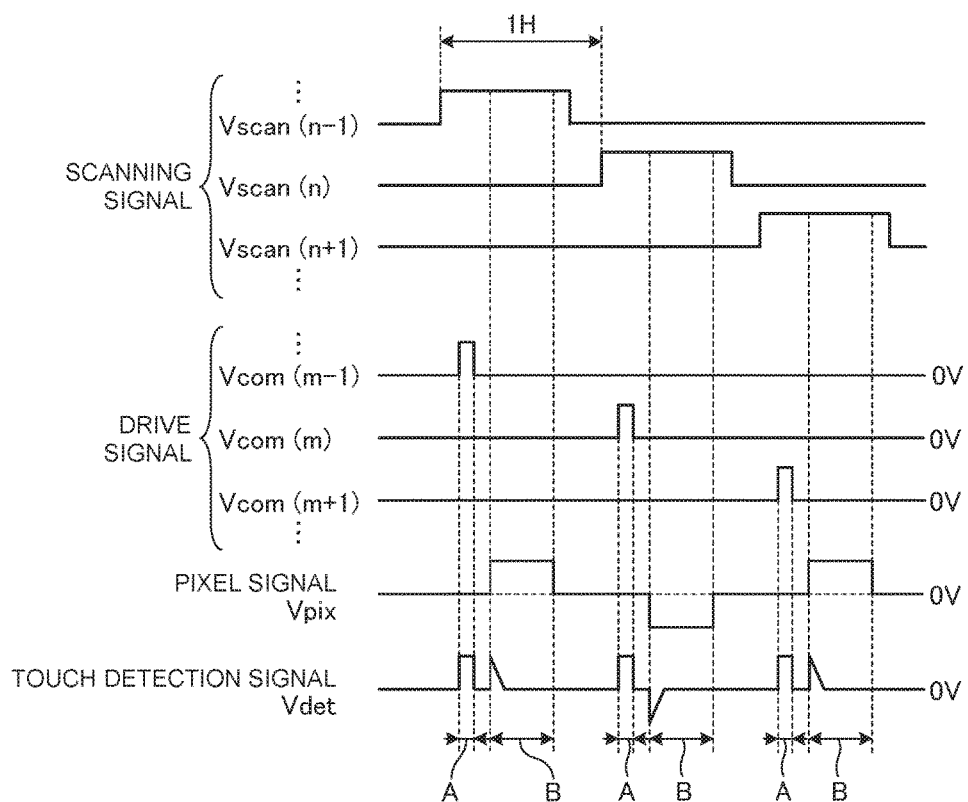
FIG. 12 is a timing waveform chart of an exemplary operation of the display device with a touch detecting function according to the first embodiment.

The following describes a specific operation of the display device 1 with a touch detecting function. FIG. 12 is a timing waveform chart of an exemplary operation of the display device with a touch detecting function according to the first embodiment. As illustrated in FIG. 12, the liquid-crystal display unit 20 performs sequential scanning on each horizontal line of successive scanning signal lines GCL of the (n−1)-th row, the n-th row, and the (n+1)-th row among the scanning signal lines GCL based on the scanning signal Vscan supplied from the gate driver 12, thereby performing display. Similarly, the drive electrode driver 14 supplies a predetermined voltage to successive predetermined drive electrodes COML corresponding to the drive signals supplied to the (m−1)-th column, the m-th column, and the (m+1)-th column corresponding to the horizontal lines thus scanned among the drive electrodes COML of the display unit 10 with a touch detecting function based on the control signal supplied from the control unit 11.

As described above, the display device 1 with a touch detecting function performs the touch detection operation (touch detection period A) and the display operation (display period B) by time division in each display horizontal period 1H. In the touch detection operation, the display device 1 with a touch detecting function selects a different drive electrode COML and applies the drive signal Vcom thereto in each display horizontal period 1H, thereby performing scanning for touch detection. The following describes the operation in detail.

The gate driver 12 applies the scanning signal Vscan to the scanning signal line GCL of the (n−1)-th row, thereby changing a scanning signal Vscan(n−1) from a low level to a high level. This starts a display horizontal period 1H.

In the touch detection period A, the drive electrode driver 14 applies the drive signal Vcom to the drive electrode COML of the (m−1)-th column, thereby changing a drive signal Vcom(m−1) from a low level to a high level. The drive signal Vcom(m−1) is transmitted to the touch detection electrode TDL via capacitance, thereby changing the touch detection signal Vdet. When the drive signal Vcom(m−1) changes from the high level to the low level, the touch detection signal Vdet changes in the same manner. The waveform of the touch detection signal Vdet in the touch detection period A corresponds to the touch detection signal Vdet in the basic principle of touch detection described above. The A/D converter 43 carries out A/D conversion on the touch detection signal Vdet in the touch detection period A, thereby performing touch detection. Thus, the display device 1 with a touch detecting function performs touch detection of one detection line (an area corresponding to one drive electrode COML).

In the display period B, the source driver 13 applies the pixel signal Vpix to the pixel signal line SGL, thereby performing display of one horizontal line. As illustrated in FIG. 12, the change in the pixel signal Vpix is transmitted to the touch detection electrode TDL via parasitic capacitance, thereby changing the touch detection signal Vdet. In the display period B, however, the A/D converter 43 carries out no A/D conversion, making it possible to suppress influence of the change in the pixel signal Vpix on touch detection. After the source driver 13 completes supplying the pixel signal Vpix, the gate driver 12 changes the scanning signal Vscan(n−1) of the scanning signal line GCL of the (n−1) row from the high level to the low level. This display horizontal period 1H is then terminated.

Subsequently, the gate driver 12 applies the scanning signal Vscan to the scanning signal line GCL of the n-th row, which is different from the previous scanning signal line GCL, thereby changing a scanning signal Vscan(n) from a low level to a high level. This starts the next display horizontal period 1H.

In the subsequent touch detection period A, the drive electrode driver 14 applies the drive signal Vcom to the drive electrode COML of the m-th column, which is different from the previous drive electrode COML. The A/D converter 43 carries out A/D conversion on a change in the touch detection signal Vdet, thereby performing touch detection of the detection line. The drive electrode COML corresponding to the m−1-th column may be possibly the same as the drive electrode COML corresponding to the m-th column. As a result, touch detections in different display horizontal periods may possibly be performed in the same area.

In the display period B, the source driver 13 applies the pixel signal Vpix to the pixel signal line SGL, thereby performing display of one horizontal line. The display device 1 with a touch detecting function according to the embodiment performs dot inversion drive. As a result, the polarity of the pixel signal Vpix applied by the source driver 13 is inverted from that in the previous display horizontal period 1H. After the display period B is terminated, this display horizontal period 1H is terminated.

By repeating the operation described above, the display device 1 with a touch detecting function performs a display operation by scanning the entire display surface and performs a touch detection operation by scanning the entire touch detection surface. After scanning the entire touch detection surface, the display device 1 with a touch detecting function detects a touch position based on the touch detection signal detected by the touch detection electrode while each drive electrode COML is driving. At this time, the display device 1 with a touch detecting function performs interpolation using the touch detection signal obtained when the drive electrode COML that detects the touch is driving and touch detection signals obtained when drive electrodes COML adjacent to the drive electrode COML that detects the touch are driving. Specifically, the display device 1 with a touch detecting function derives the position in the area corresponding to the drive electrode COML based on distribution of the touch detection signals in the adjacent areas.

As described above, the display device 1 with a touch detecting function operates such that the direction to perform the display scanning and the direction to perform the touch detection scanning are different from each other. This means that both the display operation and the touch detection operation are surely performed in a certain pixel Pix in a certain display horizontal period 1H. The display device 1 with a touch detecting function performs the touch detection operation in the touch detection period A and performs the display operation in the display period B in a display horizontal period 1H. Because the touch detection operation and the display operation are performed separately in the respective periods, the display device 1 with a touch detecting function can perform both the display operation and the touch detection operation in a single display horizontal period 1H. In addition, the display device 1 with a touch detecting function can suppress influence of the display operation on the touch detection. The display device 1 with a touch detecting function may perform display processing of the entire display surface, that is, display processing of an image of one frame and touch detection processing of the entire touch detection surface alternately. The display device 1 with a touch detecting function may perform display processing of a horizontal line corresponding to a drive electrode COML and then perform touch detection processing of the area corresponding to the drive electrode COML.

1-1C. Drive Electrode Layer

Figure 13:
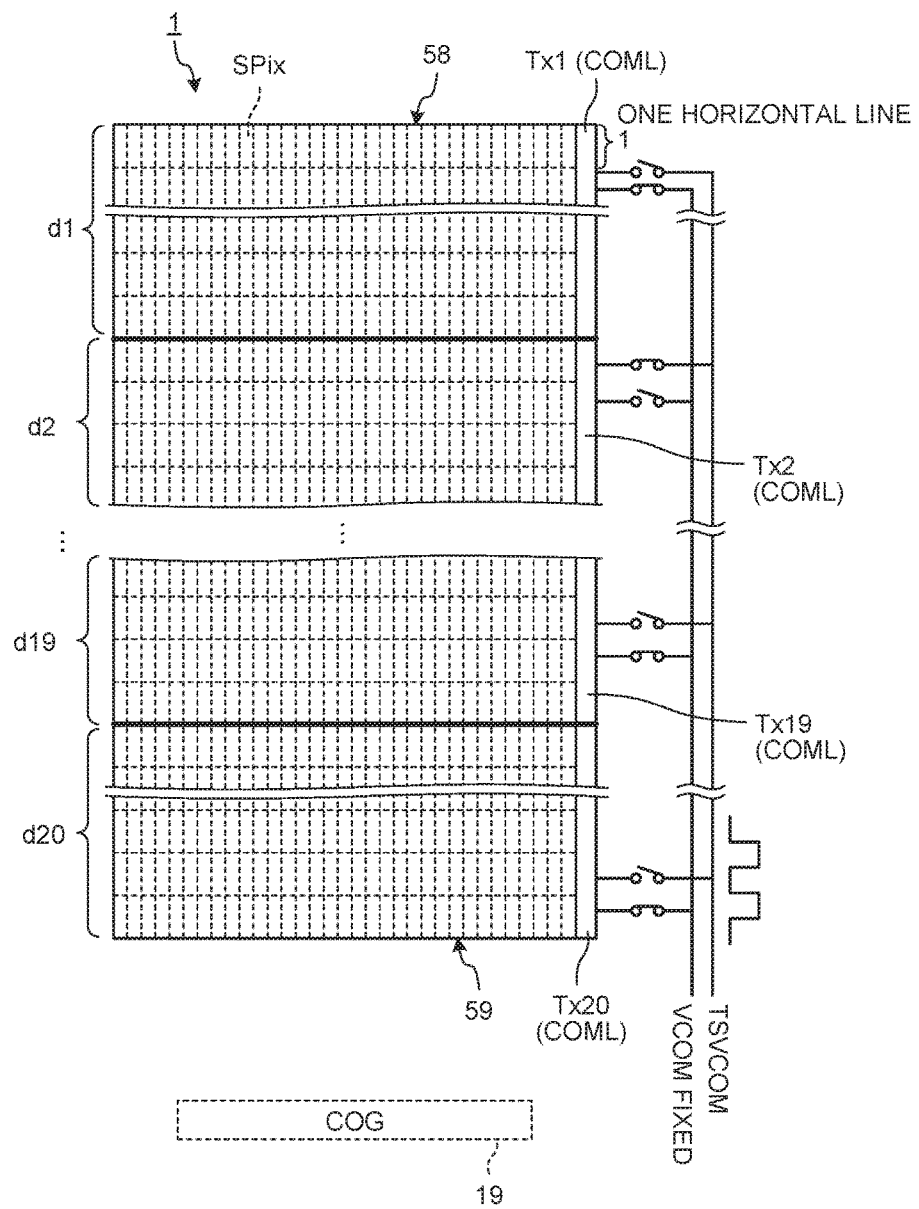
FIG. 13 is a plan view illustrating a relation between a drive electrode layer and pixels of the display device with a touch detecting function according to the first embodiment.

The following describes the drive electrodes COML included in the drive electrode layer. FIG. 13 is a plan view illustrating a relation between the drive electrode layer and the pixels of the display device with a touch detecting function according to the first embodiment. To explain the drive electrodes COML arranged in the array direction, the following describes the case where 20 drive electrodes COML are arrayed. In the array direction of the drive electrodes COML, an end on the side far from the COG 19 is referred to as an upper end 58, whereas an end on the side close to the COG 19 is referred to as a lower end 59. The drive electrodes COML thus arranged are referred to as drive electrodes Tx1, Tx2, . . . , Tx19, and Tx20 in order from the upper end 58 to the lower end 59. In terms of the drive electrodes COML illustrated in FIG. 13, TSVCOM is applied to a drive electrode COML that detects a touch in touch detection, whereas a constant voltage VCOM is applied to the other drive electrodes COML.

In the display device 1 with a touch detecting function according to the embodiment, the drive electrodes COML included in the drive electrode layer are arranged in a line in the array direction (short direction of a drive electrode COML) as described above. In the drive electrode layer, the drive electrodes COML arranged at the ends (end drive electrodes), that is, the drive electrode Tx1 arranged at the upper end 58 and the drive electrode Tx20 arranged at the lower end 59 have a larger width (length) in the array direction than that of the other drive electrodes, that is, the drive electrodes Tx2 to Tx19 arranged inside (center side) of the drive electrodes Tx1 and Tx20 in the array direction as illustrated in FIG. 13. Assuming that the length of the drive electrode Tx1 in the array direction is d1, the length of the drive electrode Tx2 in the array direction is d2, the lengths of the drive electrodes Tx3 to Tx19 in the array direction are d3 to d19, respectively, and the length of the drive electrode Tx20 in the array direction is d20, the lengths d1 and d20 are larger than the lengths d2 to d19 in the display device 1 with a touch detecting function. The lengths d1 and d20 are the same length, and the lengths d2 to d19 are the same length. In other words, the relation among the length d1 to the length d20 in the display device 1 with a touch detecting function is expressed by: d1=d20>d2=d3=d4= . . . =d19. The drive electrodes Tx1 to Tx20 are each arranged in a manner corresponding to the horizontal line of the pixel Pix. In other words, the boundary positions of the drive electrodes Tx1 to Tx20 each correspond to the boundary of the horizontal line of the sub-pixel SPix (or the pixel Pix). Specifically, the widths of the drive electrodes Tx1 to Tx20 in the array direction are integral multiples of the width of the horizontal line. One horizontal line corresponds to one drive electrode COML (any one of the drive electrodes Tx1 to Tx20). In the case where the display device 1 with a touch detecting function has 1280 horizontal lines, for example, the lengths d1 and d20 are equal to a length of 82 horizontal lines, whereas the lengths d2 to d19 are equal to a length of 62 horizontal lines. The relation between the lengths d1 and d20 and the lengths d2 to d19 is not limited thereto. In drive electrodes Tx1 to Tx20, connecting portions that couple with the wirings to which VCOM and TSVCOM are applied extend outward from the end of the display surface (effective pixel area).

Figure 14:
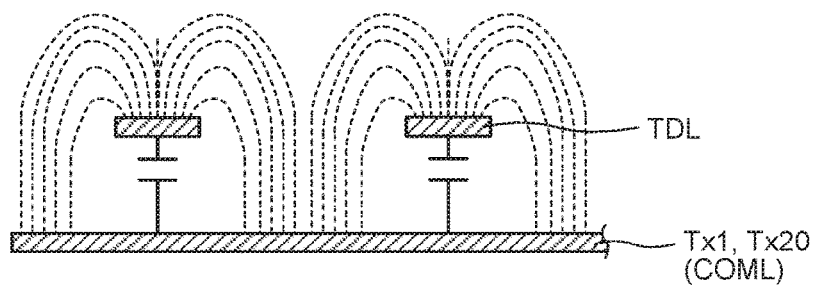
FIG. 14 is a view schematically illustrating lines of electric force between a drive electrode arranged at an end in an array direction and touch detection electrodes in the display device with a touch detecting function according to the first embodiment.
Figure 15:
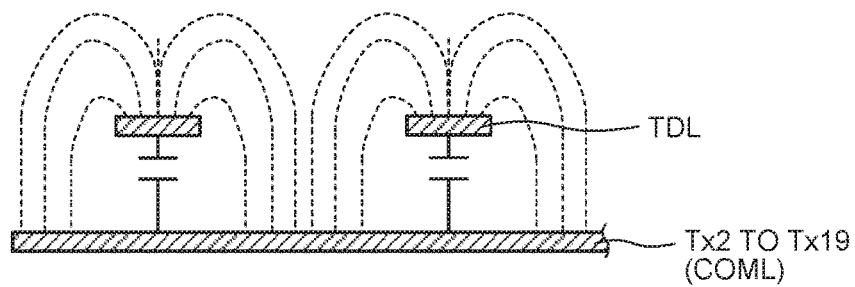
FIG. 15 is a view schematically illustrating lines of electric force between a drive electrode arranged in the middle in the array direction and touch detection electrodes in the display device with a touch detecting function according to the first embodiment.

FIG. 14 is a view schematically illustrating lines of electric force between the drive electrode arranged at the end in the array direction and the touch detection electrodes in the display device with a touch detecting function according to the first embodiment. FIG. 15 is a view schematically illustrating lines of electric force between the drive electrode arranged in the middle in the array direction and the touch detection electrodes in the display device with a touch detecting function according to the first embodiment. FIG. 14 schematically illustrates the relation between the drive electrodes Tx1 and Tx20 and the touch detection electrodes TDL. FIG. 15 schematically illustrates the relation between the drive electrodes Tx2 to Tx19 and the touch detection electrodes TDL.

In the display device 1 with a touch detecting function, the drive electrodes Tx1 and Tx20 arranged at the ends of the upper end 58 and the lower end 59, respectively, have a larger length in the array direction. This makes the intensity of the fringe electric field of the drive electrodes Tx1 and Tx20 higher than that of the other drive electrodes Tx2 to Tx19 and makes the number of lines of electric force thereof larger as illustrated in FIG. 14 and FIG. 15. In FIG. 14, the intensity of the fringe electric field seems higher than that of FIG. 15 on the section in the extending direction of the drive electrode COML. The intensity of the fringe electric field is actually made higher by increasing the length of the drive electrode COML in the depth direction of the drawing.

Figure 16A:
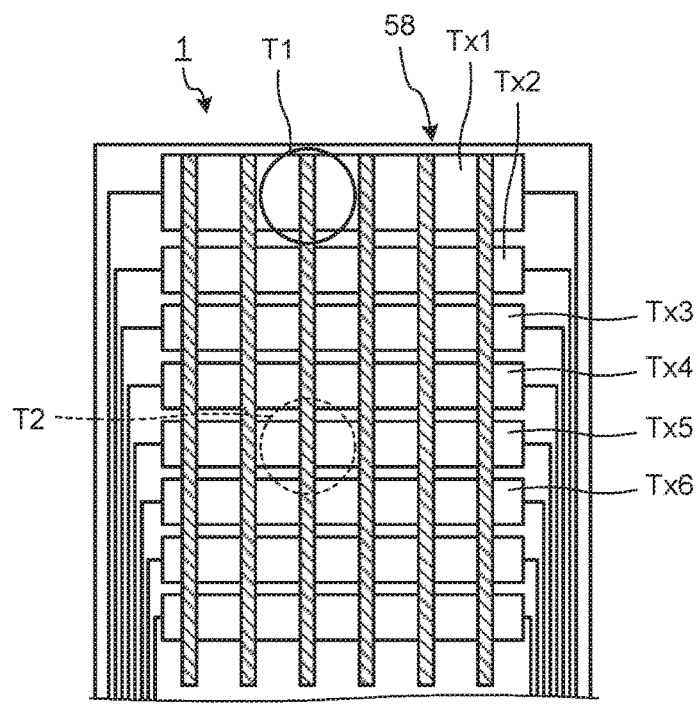
FIG. 16A is a view schematically illustrating a relative position between touch positions and the drive electrodes of the display device with a touch detecting function according to the first embodiment.
Figure 16B:
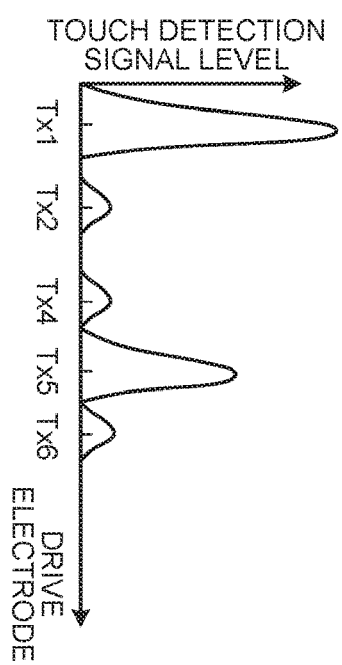
FIG. 16B is a schematic of an example of touch detection signals detected by a touch detection electrode of the display device with a touch detecting function illustrated in FIG. 16A.

The following describes the relation between a touch position and a touch detection signal. FIG. 16A is a view schematically illustrating a relative position between touch positions and the drive electrodes of the display device with a touch detecting function according to the first embodiment. FIG. 16B is a schematic of an example of touch detection signals detected by a touch detection electrode of the display device with a touch detecting function illustrated in FIG. 16A.

As illustrated in FIG. 16A, when touches are made at two positions of an area T1 on the drive electrode Tx1 arranged at the upper end 58 and an area T2 on the drive electrode Tx5 arranged in the middle on a single touch detection electrode, the display device 1 with a touch detecting function detects touch detection signals illustrated in FIG. 16B. Specifically, higher-level signals are detected at a detection timing of the drive electrode Tx1 overlapping the area T1 that is the touch position and a detection timing of the drive electrode Tx5 overlapping the area T2 that is the touch position. A certain level signal is detected at a detection timing of the drive electrode Tx2 adjacent to the drive electrode Tx1 overlapping the area T1. Certain level signals are detected at detection timings of the drive electrodes Tx4 and Tx6 adjacent to the drive electrode Tx5 overlapping the area T2.

In the display device 1 with a touch detecting function, the length of the drive electrode Tx1 in the array direction is larger than that of the other drive electrodes Tx2 to Tx19. As a result, the signal detected at the detection timing of the drive electrode Tx1 is detected as a signal at a higher level than that of the signal detected at the detection timing of the drive electrode Tx5.

Figure 17A:
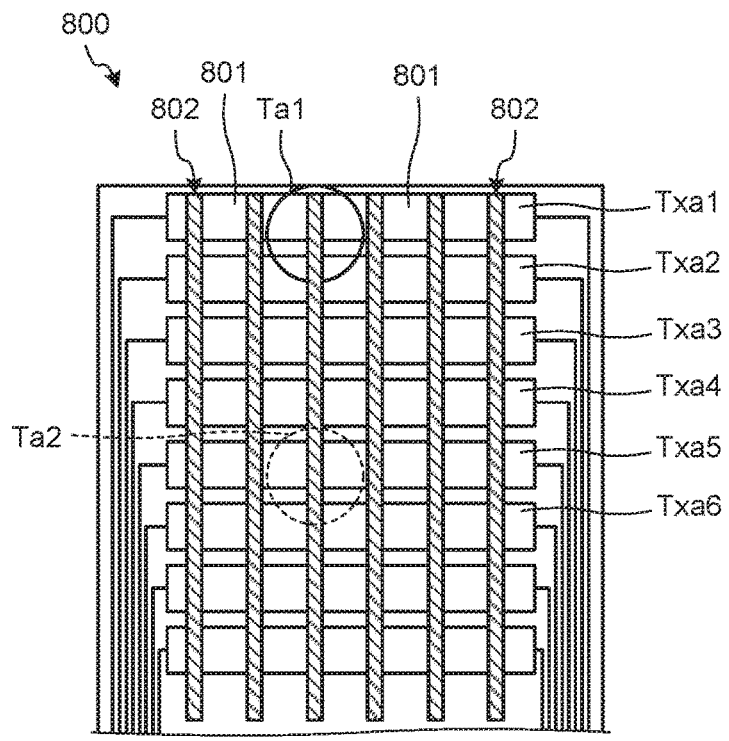
FIG. 17A is a view schematically illustrating a relative position between touch positions and drive electrodes of a display device with a touch detecting function according to a comparative example.
Figure 17B:
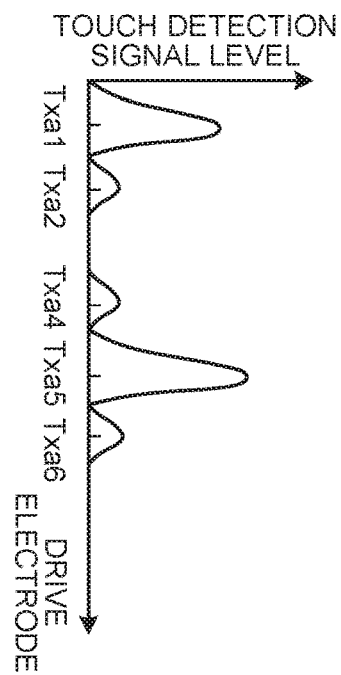
FIG. 17B is a schematic of an example of touch detection signals detected by a touch detection electrode of the display device with a touch detecting function illustrated in FIG. 17A.

FIG. 17A is a view schematically illustrating a relative position between touch positions and drive electrodes of a display device with a touch detecting function according to a comparative example. FIG. 17B is a schematic of an example of touch detection signals detected by a touch detection electrode of the display device with a touch detecting function illustrated in FIG. 17A. FIG. 17A and FIG. 17B illustrate touch positions and touch detection levels, respectively, in a comparative example in which the length of drive electrodes arranged at the ends in the array direction is the same as that of the other electrodes, that is, the length of the drive electrodes arranged at the ends in the array direction is not larger than that of the other electrodes. Similarly to the display device 1 with a touch detecting function, a display device 800 with a touch detecting function according to the comparative example is provided with a plurality of drive electrodes 801 and a plurality of touch detection electrodes 802. The display device 800 with a touch detecting function has the same configuration as that of the display device 1 with a touch detecting function except for the width of the drive electrodes 801 in the array direction. In the display device 800 with a touch detecting function, the drive electrodes 801 are referred to as drive electrodes Txa1, Txa2, Txa3, Txa4, Txa5, . . . in order from the upper end to the lower end.

As illustrated in FIG. 17A, when touches are made at two positions of an area Ta1 on the drive electrode Txa1 arranged at the upper end and an area Ta2 on the drive electrode Txa5 arranged in the middle on a single touch detection electrode, the display device 800 with a touch detecting function detects touch detection signals illustrated in FIG. 17B. Specifically, higher-level signals are detected at a detection timing of the drive electrode Txa1 overlapping the area Ta1 that is the touch position and a detection timing of the drive electrode Txa5 overlapping the area Ta2 that is the touch position. A certain level signal is detected at a detection timing of the drive electrode Txa2 adjacent to the drive electrode Txa1 overlapping the area Ta1. Certain level signals are detected at detection timings of the drive electrodes Txa4 and Txa6 adjacent to the drive electrode Txa5 overlapping the area Ta2. In the display device 800 with a touch detecting function, the length of the drive electrode Txa1 in the array direction is the same as that of the other drive electrodes Txa2 to Txa19. As a result, the signal detected at the detection timing of the drive electrode Txa1 is detected as a signal at substantially the same level as that of the signal detected at the detection timing of the drive electrode Txa5.

As described above, the length of the drive electrodes Tx1 and Tx20 arranged at the ends (the upper end 58 and the lower end 59) in the array direction are larger in the display device 1 with a touch detecting function. In the case where a touch is made in areas corresponding to the drive electrodes Tx1 and Tx20 arranged at the ends (the upper end 58 and the lower end 59), the display device 1 with a touch detecting function can detect the touch detection signal as a signal at a higher level than that of the touch detection signals detected at the other drive electrode Tx2 to Tx19.

The display device 1 with a touch detecting function performs interpolation using touch detection signals detected at a plurality of detection timings of adjacent drive electrodes COML, that is, a plurality of touch detection signals detected in adjacent areas in the array direction as described above. Thus, the display device 1 with a touch detecting function detects the touch position in the area where the drive electrode COML is arranged with higher accuracy. When the touch is made in an area corresponding to a drive electrode arranged in the middle in the array direction like the areas T2 and Ta2, the display device 1 with a touch detecting function performs interpolation using touch detection signals detected in areas corresponding to drive electrodes adjacent to the area on both sides in the array direction. Performing the interpolation enables the display device 1 with a touch detecting function to identify the touch position in the array direction with higher accuracy.

The display device 1 with a touch detecting function detects the touch detection signal at the ends (the upper end 58 and the lower end 59) at higher level than that of the other positions. As a result, the display device 1 with a touch detecting function can increase the accuracy of the interpolation of the position in the area corresponding to the drive electrodes COML arranged at the ends having no adjacent drive electrode COML arranged on one side thereof in the array direction. In other words, the display device 1 with a touch detecting function can detect the touch detection signal at the ends at higher level than that of the other positions, thereby detecting a change in the detection level caused by a change in the detection position with higher accuracy. This enables the display device 1 with a touch detecting function to obtain a more accurate touch detection signal at the ends. In the case where a touch detection signal detected on one side in the array direction alone is used for the interpolation, the display device 1 with a touch detecting function can perform the interpolation with high accuracy, thereby identifying the touch position in the array direction with high accuracy. The display device 1 with a touch detecting function can increase the accuracy of the position at the ends (the upper end 58 and the lower end 59) and suppress fluctuations in the detection accuracy with respect to the area in the middle. This can increase the touch detecting function as a whole.

In the display device 1 with a touch detecting function, the length of the drive electrode COML in the array direction is preferably set to an integral multiple of the length of one horizontal line, that is, of the pixel Pix in the array direction like the embodiment. In the display device 1 with a touch detecting function, one drive electrode is preferably arranged in a manner facing one horizontal line. In other words, in the display device 1 with a touch detecting function, a boundary between drive electrodes in the array direction preferably overlaps a boundary of horizontal lines. This can facilitate control performed when the drive electrodes COML are used as drive electrodes to display an image on the display surface.

In the display device 1 with a touch detecting function, difference between the length in the array direction of the drive electrode arranged at the ends and that of the other drive electrodes is preferably set to an even multiple of the length of a horizontal line, that is, of the pixel Pix in the array direction. In the case where both ends of the drive electrodes in the lateral direction (direction perpendicular to the array direction) are each provided with a circuit, the configuration described above enables arrangement of the circuits having a similar configuration on both ends. This can facilitate designing, manufacturing, and controlling the display device 1 with a touch detecting function.

In the display device 1 with a touch detecting function, the drive electrode layer is preferably symmetric with respect to the center in the array direction. This can facilitate designing, manufacturing, and controlling the display device 1 with a touch detecting function. By making the width of the drive electrodes arranged at both ends in the array direction larger than that of the other drive electrodes as described above, it is possible to provide the advantages described above more appropriately.

While the drive electrode COML is a plate-shaped transparent electrode in the display device 1 with a touch detecting function according to the embodiment, the shape of the drive electrode COML is not limited thereto. In the display device 1 with a touch detecting function, one drive electrode COML may be divided into plurality. In the display device 1 with a touch detecting function, one drive electrode COML may be formed of a plurality of unit drive electrodes divided for each horizontal line, for example. Also in this case, the display device 1 with a touch detecting function drives a plurality of unit drive electrodes included in one drive electrode COML synchronously in touch detection.

1-2. Second Embodiment

Figure 18:
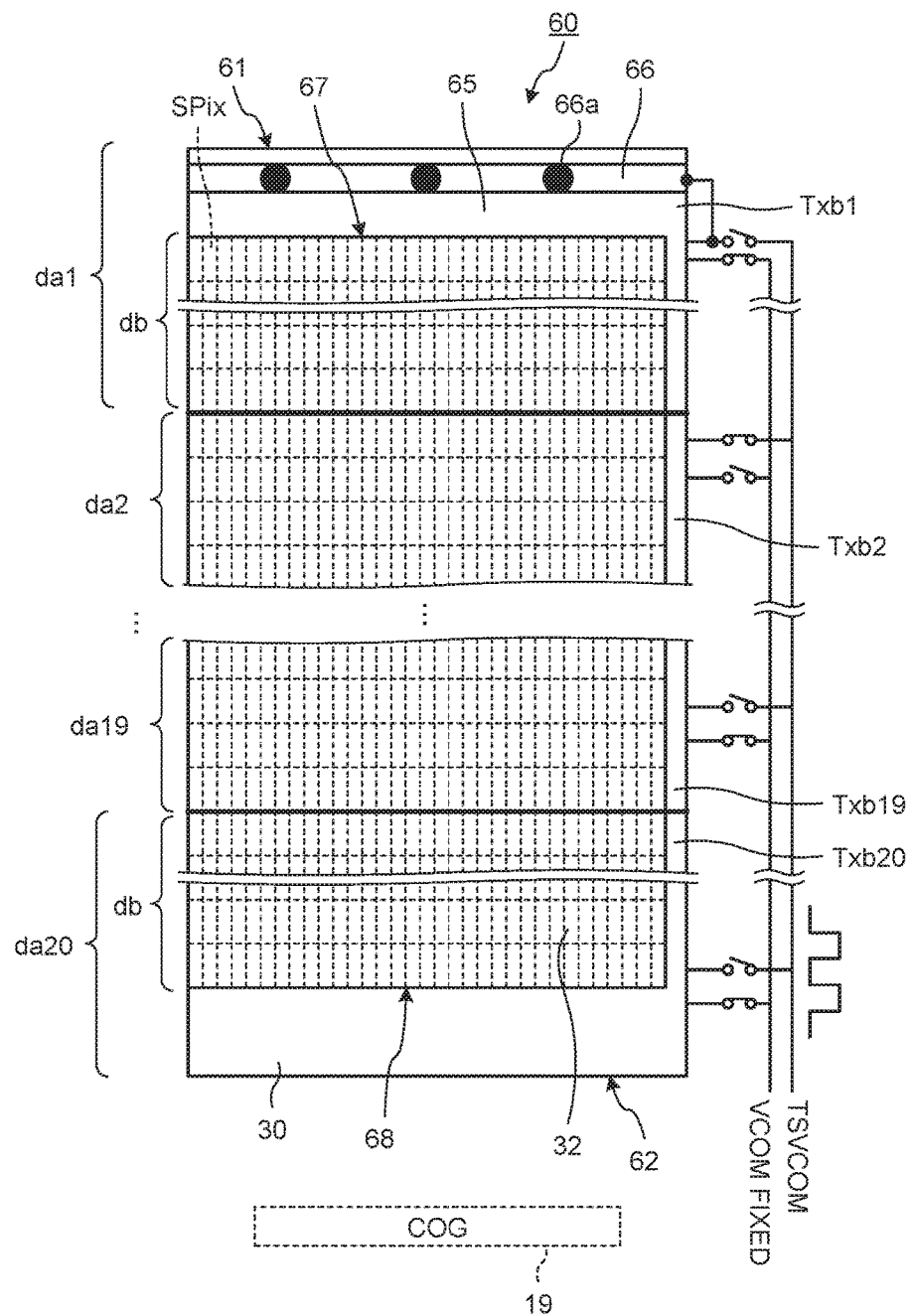
FIG. 18 is a plan view illustrating a relation between a drive electrode layer and pixels of a display device with a touch detecting function according to a second embodiment.

The following describes a display device with a touch detecting function according to a second embodiment of the present disclosure with reference to FIG. 18. FIG. 18 is a plan view illustrating a relation between a drive electrode layer and pixels of the display device with a touch detecting function according to the second embodiment. A display device 60 with a touch detecting function according to the second embodiment basically has the same configuration as that of the display device 1 with a touch detecting function according to the first embodiment except for the drive electrode layer. The following especially describes points unique to the display device 60 with a touch detecting function according to the second embodiment.

In the display device 1 with a touch detecting function according to the first embodiment, the display surface and the touch detection surface are the same in size. In addition, the width in the array direction of the drive electrodes Tx1 and Tx20 arranged at the ends in the array direction is larger than that of the other drive electrodes Tx2 to Tx19. The configuration of the display device 1 with a touch detecting function is not limited thereto. The display device 60 with a touch detecting function according to the second embodiment is provided with a drive electrode layer in an area larger than an effective pixel area serving as a display surface of a liquid-crystal display unit 20, that is, an area in which pixels Pix are arranged. To explain a plurality of drive electrodes COML arranged in the array direction, the following describes the case where 20 drive electrodes COML are arrayed in the second embodiment as well. In the array direction of the drive electrodes COML, an end on the side far from a COG 19 is referred to as an upper end 61, whereas an end on the side close to the COG 19 is referred to as a lower end 62. The drive electrodes COML thus arranged are referred to as drive electrodes Txb1, Txb2, ..., Txb19, and Txb20 in order from the upper end 61 to the lower end 62.

In the display device 60 with a touch detecting function, the drive electrodes COML arranged at the ends (end drive electrodes) in the array direction, that is, the drive electrode Txb1 arranged at the upper end 61 and the drive electrode Txb20 arranged at the lower end 62 have a larger width (length) in the array direction than that of the other drive electrodes, that is, the drive electrodes Txb2 to Txb19. Assuming that the length of the drive electrode Txb1 in the array direction is da1, the length of the drive electrode Txb2 in the array direction is da2, the lengths of the drive electrodes Txb3 to Txb19 in the array direction are da3 to da19, respectively, and the length of the drive electrode Txb20 in the array direction is da20, the lengths da1 and da20 are larger than the lengths da2 to da19 in the display device 60 with a touch detecting function. The lengths da1 and da20 are the same length, and the lengths da2 to da19 are the same length. In other words, the relation among the length da1 to the length da20 in the display device 60 with a touch detecting function is expressed by: da1=da20>da2=da3=da4= ... =da19. In the drive electrodes Txb1 to Txb20, connecting portions that couple with the wirings to which VCOM and TSVCOM are applied extend outward from the end of the display surface (effective pixel area).

The end of the drive electrode Txb1 on the upper end 61 side extends upward from a display surface upper end 67 that is the upper end of the display surface (effective pixel area). In other words, the drive electrode Txb1 has an area in which no pixel Pix is arranged on the upper end 61 side. The drive electrode Txb1 is provided with a metal wiring 66 coupled to the wiring to which TSVCOM is applied in an area 65 in which no pixel Pix is arranged on the upper end 61 side. The drive electrode Txb1 is electrically coupled to the wiring via a contact portion 66a, which is a part of a portion in which the area 65 and the metal wiring 66 overlap with each other. The end of the drive electrode Txb20 on the lower end 62 side extends downward from a display surface lower end 68 that is the lower end of the display surface (effective pixel area). In other words, the drive electrode Txb20 has an area in which no pixel Pix is arranged on the lower end 62 side.

The drive electrodes Txb1 to Txb20 are each arranged in a manner corresponding to the horizontal line of the pixel Pix. The boundary positions of the drive electrodes Txb1 to Txb20 each correspond to the boundary of the horizontal line of the pixel Pix. In other words, the widths of the drive electrodes Txb1 to Txb20 in the array direction are integral multiples of the width of the horizontal line. One horizontal line corresponds to one drive electrode COML (any one of the drive electrodes Txb1 to Txb20). The drive electrodes Txb1 to Txb20 correspond to the same number of horizontal lines. In the case where the display device 60 with a touch detecting function has 1280 horizontal lines, for example, the lengths d1 and d20 are equal to a length of 80 horizontal lines, whereas the lengths d2 to d19 are equal to a length of 64 horizontal lines. The drive electrodes Txb1 and Txb20 each face 64 horizontal lines, and the remaining area for 16 horizontal lines corresponds to the area in which no pixel Pix is arranged in the array direction. In the drive electrodes Txb1 and Txb20, a portion of a length db faces the horizontal lines, and an area closer to the end in the array direction than the area corresponds to the area in which no pixel Pix is arranged. The relation between the lengths da1 and da20 and the lengths da2 to da19 is not limited thereto.

In the display device 60 with a touch detecting function, the drive electrodes Txb1 and Txb20 are arranged at the ends to extend outward from the display surface in the array direction, thereby making the length of the drive electrodes Txb1 and Txb20 in the array direction larger than the length of the other drive electrodes Txb2 to Txb19. By extending the drive electrodes Txb1 and Txb20 arranged at the ends outward from the display surface and making the width of the drive electrodes arranged at the ends larger in this manner, it is possible to enhance the detection accuracy of a touch at the ends similarly to the first embodiment.

The display device 60 with a touch detecting function is provided with the contact 66a coupled to the metal wiring 66 in the area 65 of the drive electrode Txb1 arranged at the upper end. This configuration can reduce the time constant in application of a voltage to the drive electrode Txb1 farthest from the COG 19, thereby increasing the responsiveness of the drive electrode Txb1 arranged at the upper end. This can reduce the time from when the application of a voltage is started to when detection of a touch signal becomes ready to be performed, thereby reducing the time for touch detection.

In the case where the drive electrode arranged at the end extends to the area outside of the display surface like the display device 60 with a touch detecting function according to the present embodiment, the length of the portion outside of the display surface is not necessarily an integral multiple of the length of the horizontal line.

While the explanation has been made of the embodiments of various types of devices to which the present disclosure is applied, the present disclosure is not limited to the embodiments. Various changes can be made therein besides the embodiments.

The embodiments, for example, performs scanning in the array direction by driving the drive electrodes COML one by one, that is, by applying TSVCOM to one drive electrode COML alone at a time. The present disclosure is not limited thereto. The display device with a touch detecting function may apply TSVCOM to a plurality of drive electrodes COML simultaneously. In this case, the display device with a touch detecting function calculates difference by shifting the drive electrodes COML to which TSVCOM is applied one by one, thereby detecting a touch detection signal in an area corresponding to one drive electrode COML.

The display unit 10 with a touch detecting function may be obtained by integrating the liquid-crystal display unit 20 using a liquid-crystal of various types of modes, such as FFS mode and IPS mode, with the touch detecting device 30.

Alternatively, the display unit 10 with a touch detecting function may be obtained by integrating a liquid-crystal of various types of modes, such as twisted nematic (TN) mode, vertical alignment (VA) mode, and electrically controlled birefringence (ECB) mode, with a touch detecting device. The display unit 10 with a touch detecting function may use a lateral electric-field mode liquid crystal.

In the embodiments, the explanation has been made of the case where the display unit with a touch detecting function is what is called an in-cell device obtained by integrating the liquid-crystal display unit 20 with the capacitive touch detecting device 30 to make the display unit thinner. Alternatively, a capacitive touch detecting device may be attached to a liquid-crystal display unit, for example. While the explanation has been made of the display unit with a touch detecting function in the embodiments, the present disclosure may be applied to a touch detection device provided with no liquid-crystal display unit (display device).

2. Application Examples

The following describes application examples of the display units 1 and 60 with a touch detecting function explained in the embodiments and the modification with reference to FIG. 19 to FIG. 25. FIG. 19 to FIG. 25 are schematics of examples of electronic apparatuses to which the display devices 1 and 60 with a touch detecting function according to the embodiments are applied. The display devices 1 and 60 with a touch detecting function according to the first and the second embodiments are applicable to electronic apparatuses of all fields, such as television apparatuses, digital cameras, notebook personal computers, portable electronic apparatuses including mobile phones, and video cameras. In other words, the display devices 1 and 60 with a touch detecting function according to the first and the second embodiments are applicable to electronic apparatuses of all fields that display video signals received from the outside or video signals generated inside thereof as an image or video.

2-1. First Application Example

Figure 19:
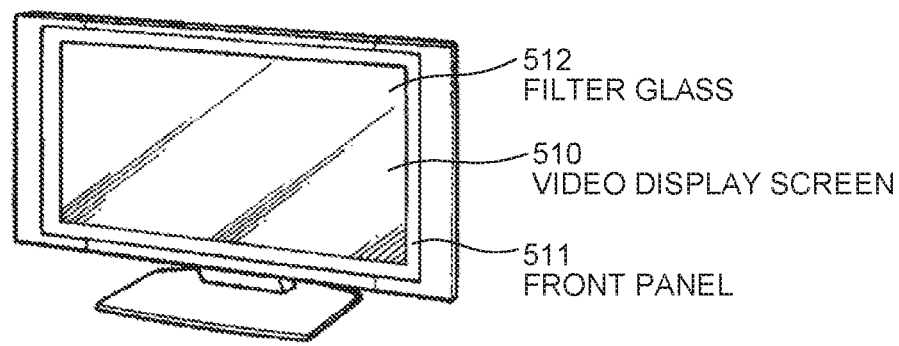
FIG. 19 is a schematic of an example of an electronic apparatus to which the display devices with a touch detecting function according to the embodiments are applied.

An electronic apparatus illustrated in FIG. 19 is a television apparatus to which the display devices 1 and 60 with a touch detecting function according to the first and the second embodiments are applied. The television apparatus has a video display screen 510 including a front panel 511 and a filter glass 512, for example. The video display screen 510 corresponds to the display devices with a touch detecting function according to the first and the second embodiments.

2-2. Second Application Example

Figure 20:
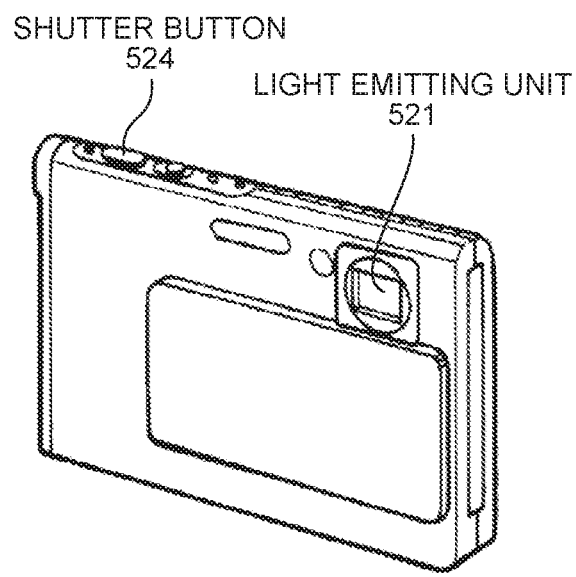
FIG. 20 is a schematic of another example of the electronic apparatus to which the display devices with a touch detecting function according to the embodiments are applied.
Figure 21:
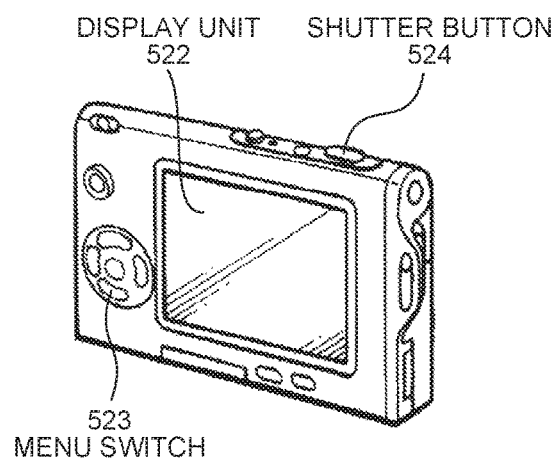
FIG. 21 is a schematic of still another example of the electronic apparatus to which the display devices with a touch detecting function according to the embodiments are applied.

An electronic apparatus illustrated in FIG. 20 and FIG. 21 is a digital camera to which the display devices 1 and 60 with a touch detecting function according to the first and the second embodiments are applied. The digital camera includes a light emitting unit 521 for flash, a display unit 522, a menu switch 523, and a shutter button 524, for example. The display unit 522 corresponds to the display devices 1 and 60 with a touch detecting function according to the first and the second embodiments.

2-3. Third Application Example

Figure 22:
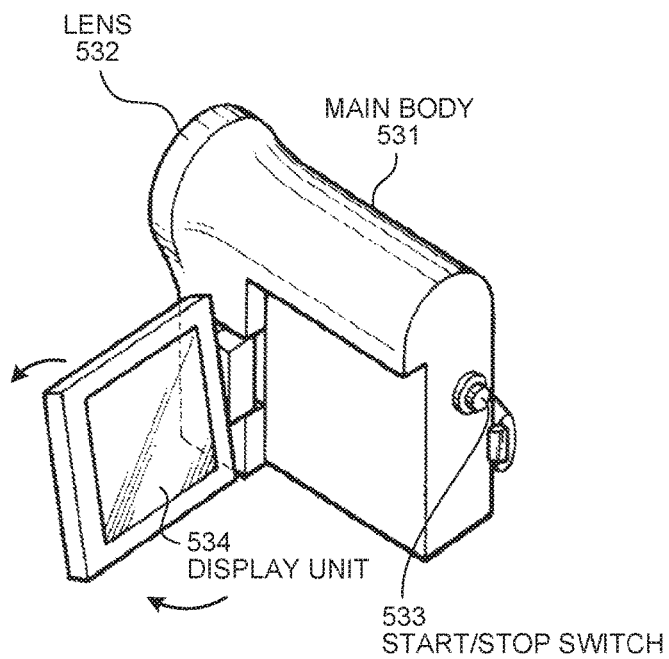
FIG. 22 is a schematic of still another example of the electronic apparatus to which the display devices with a touch detecting function according to the embodiments are applied.

An electronic apparatus illustrated in FIG. 22 is a video camera to which the display devices 1 and 60 with a touch detecting function according to the first and the second embodiments are applied. The video camera includes a main body 531, a lens 532 provided to the front side surface of the main body 531 and used for photographing a subject, a start/stop switch 533 used in photographing, and a display unit 534, for example. The display unit 534 corresponds to the display devices 1 and 60 with a touch detecting function according to the first and the second embodiments.

2-4. Fourth Application Example

Figure 23:
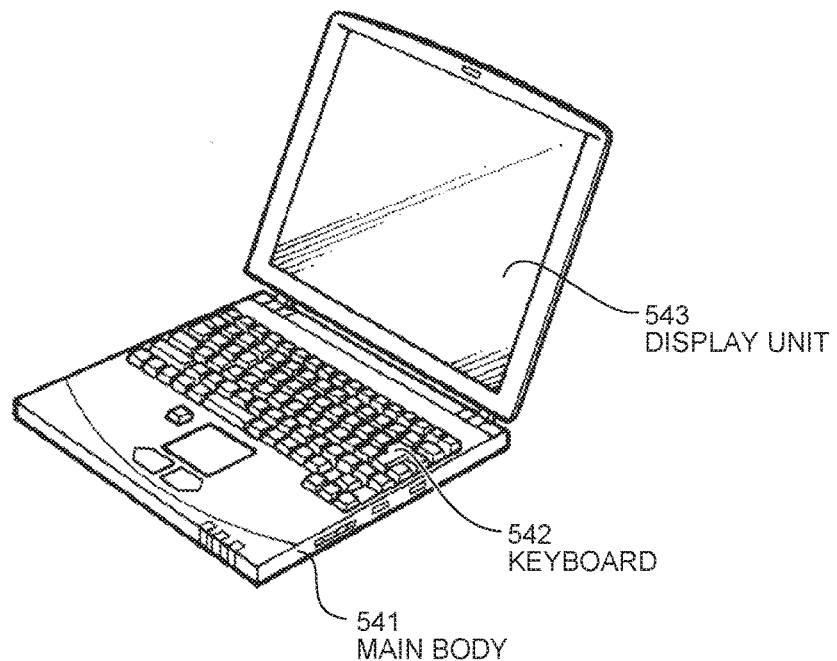
FIG. 23 is a schematic of still another example of the electronic apparatus to which the display devices with a touch detecting function according to the embodiments are applied.

An electronic apparatus illustrated in FIG. 23 is a notebook personal computer to which the display devices 1 and 60 with a touch detecting function according to the first and the second embodiments are applied. The notebook personal computer includes a main body 541, a keyboard 542 used for an input operation of a character, and a display unit 543 that displays an image, for example. The display unit 543 corresponds to the display devices 1 and 60 with a touch detecting function according to the first and the second embodiments.

2-5. Fifth Application Example

Figure 24:
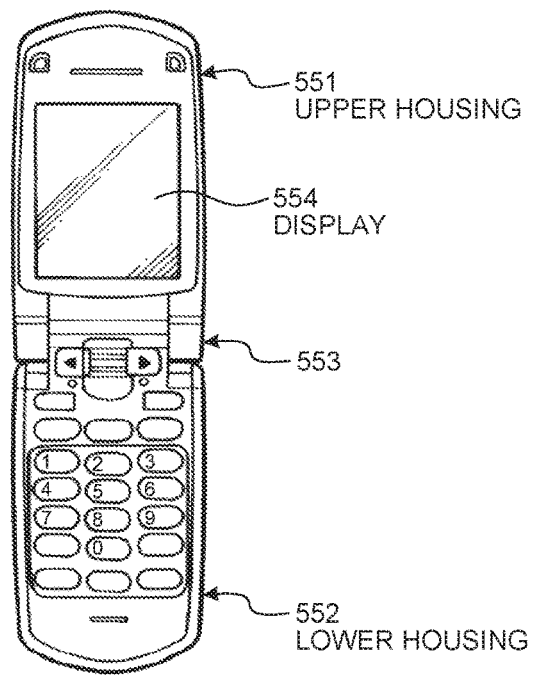
FIG. 24 is a schematic of still another example of the electronic apparatus to which the display devices with a touch detecting function according to the embodiments are applied.

An electronic apparatus illustrated in FIG. 24 is a mobile phone to which the display devices 1 and 60 with a touch detecting function according to the first and the second embodiments are applied. The mobile phone includes an upper housing 551 and a lower housing 552 connected by a connection (a hinge) 553 and a display 554, for example. The display 554 corresponds to the display devices 1 and 60 with a touch detecting function according to the first and the second embodiments.

2-6. Sixth Application Example

Figure 25:
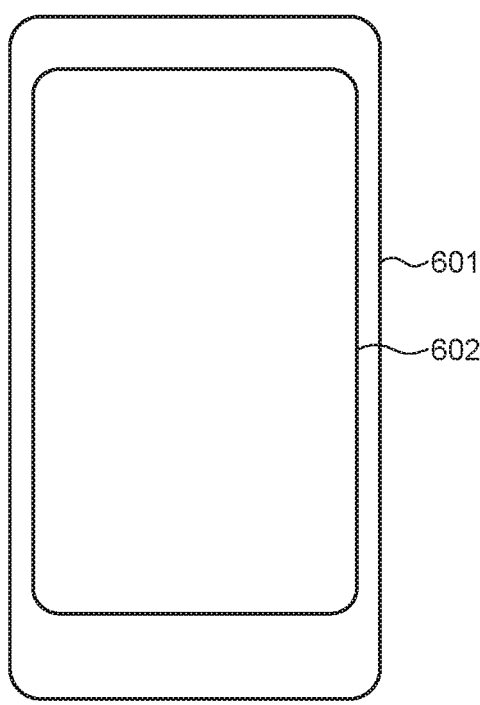
FIG. 25 is a schematic of still another example of the electronic apparatus to which the display devices with a touch detecting function according to the embodiments are applied.

An electronic apparatus illustrated in FIG. 25 is a mobile phone called a smartphone to which the display devices 1 and 60 with a touch detecting function according to the first and the second embodiments are applied. The mobile phone is provided with a touch panel 602 on the surface of a housing 601 having a substantially rectangular thin plate shape, for example. The touch panel 602 corresponds to the display devices 1 and 60 with a touch detecting function according to the first and the second embodiments.

3. Aspects of the Present Disclosure

The present disclosure includes the following aspects.

(1) A touch detection device comprising:
- a drive electrode layer including a plurality of drive electrodes formed in stripes in an array direction;
- a plurality of touch detection electrodes that are arranged in a manner facing the plurality of drive electrodes and generate capacitance with the plurality of drive electrodes; and
- a touch detecting unit that applies a touch drive signal to the plurality of drive electrodes and detects a position of an object in contiguity with a touch detection area provided with the plurality of drive electrodes and the plurality of touch detection electrodes based on detection signals supplied from the plurality of touch detection electrodes, wherein
- the plurality of the drive electrodes of the drive electrode layer include an end drive electrode that is provided to at least one end in the array direction and has a larger width in the array direction than the width in the array direction of drive electrodes other than the end drive electrode.

(2) The touch detection device according to (1), wherein, the plurality of drive electrodes in the drive electrode layer are arranged symmetrically with respect to center in the array direction.

(3) A display device with a touch detecting function having a touch detection device and a display device arranged in a manner overlapping with the touch detection device, the touch detection device comprising:
- a drive electrode layer including a plurality of drive electrodes formed in stripes in an array direction;
- a plurality of touch detection electrodes that are arranged in a manner facing the plurality of drive electrodes and generate capacitance with the plurality of drive electrodes; and
- a touch detecting unit that applies a touch drive signal to the plurality of drive electrodes and detects a position of an object in contiguity with a touch detection area provided with the plurality of drive electrodes and the plurality of touch detection electrodes based on detection signals supplied from the plurality of touch detection electrodes, wherein
- the plurality of the drive electrodes of the drive electrode layer include an end drive electrode that is provided to at least one end in the array direction and has a larger width in the array direction than the width in the array direction of drive electrodes other than the end drive electrode.

(4) The display device with a touch detecting function according to (3), wherein
the display device comprises:
- a plurality of pixel electrodes arranged on a substrate in a manner facing the drive electrode layer of the touch detection device;
- a display functional layer that is laminated on the plurality of pixel electrodes and has an image display function to display an image; and
- a control unit that applies a display drive voltage between the plurality of pixel electrodes and the plurality of drive electrodes based on an image signal and performs image display control such that the display functional layer performs the image display function.

(5) The display device with a touch detecting function according to (3), wherein, the end drive electrode in the drive electrode layer is larger than the drive electrodes other than the end drive electrode in the array direction by an integral multiple of a pixel pitch that is an arrangement interval between the plurality of pixel electrodes in a display area.

(6) The display device with a touch detecting function according to (3), wherein a part of the end drive electrode is arranged outside of the display area in the array direction.

(7) An electronic apparatus having the display device with a touch detecting function that has a touch detection device and a display device arranged in a manner overlapping with the touch detection device, the touch detection device comprising:
- a drive electrode layer including a plurality of drive electrodes formed in stripes in an array direction;
- a plurality of touch detection electrodes that are arranged in a manner facing the plurality of drive electrodes and generate capacitance with the plurality of drive electrodes; and
- a touch detecting unit that applies a touch drive signal to the plurality of drive electrodes and detects a position of an object in contiguity with a touch detection area provided with the plurality of drive electrodes and the plurality of touch detection electrodes based on detection signals supplied from the plurality of touch detection electrodes, wherein
- the plurality of the drive electrodes of the drive electrode layer include an end drive electrode that is provided to at least one end in the array direction and has a larger width in the array direction than the width in the array direction of drive electrodes other than the end drive electrode.

In the present disclosure, the detection accuracy of a touch can be enhanced in an area corresponding to a drive electrode arranged at an end in the array direction of drive electrodes, which suppresses reduction in the detection accuracy at the end. This can enhance the detection accuracy of a touch.

Specifically, the present disclosure makes the size in the array direction of a drive electrode positioned at an end in the array direction larger than that of the other drive electrodes among the drive electrodes, thereby increasing the level of a touch detection signal of the drive electrode positioned at the end. This can enhance the detection accuracy of a touch in an area corresponding to the drive electrode arranged at the end in the array direction of the drive electrodes.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus with a touch detecting function having a touch detection device and a display device arranged in a manner overlapping with the touch detection device, the display apparatus comprising:
an array substrate;
an opposed substrate opposed to the array substrate;
a display functional layer disposed between the array substrate and the opposed substrate;
a chip;
a first wire electrically connected to the chip;

a second wire extending in a direction different from the first wire;
a drive electrode layer that is disposed on the array substrate and includes a plurality of drive electrodes formed in stripes and arranged in an array direction, the drive electrodes including
 a first drive electrode that has a first width in the array direction, the first drive electrode being electrically coupled to corresponding second wires at both ends of the first drive electrode, and
 a second drive electrode having a second width in the array direction, the first width being greater than the second width, the second drive electrode being electrically coupled to corresponding second wires at both ends of the second drive electrode;
a plurality of pixel electrodes disposed on the plurality of drive electrodes via an insulation layer;
a plurality of touch detection electrodes that are arranged on an observer side of the opposed substrate in a manner facing the plurality of drive electrodes and generate capacitance with the plurality of drive electrodes;
a touch detecting unit configured to detect a position of an object in contiguity with a touch detection area based on detection signals supplied from the plurality of touch detection electrodes,
wherein the first drive electrode is farther from the chip than the second drive electrode,
wherein the second width is an integral multiple of a pixel pitch that is an arrangement interval between the plurality of pixel electrodes in a display area, and
wherein a difference between the first width and the second width is an even integral multiple of the pixel pitch.

2. The display apparatus with a touch detecting function according to claim 1, wherein
the display device comprises:
 a control unit that applies a common voltage between the plurality of pixel electrodes and the plurality of drive electrodes based on an image signal and performs image display control such that the display functional layer performs an image display function.

3. The display apparatus with a touch detecting function according to claim 1, wherein the touch detection device is configured to detect the position using the detection signals supplied from at least two adjacent touch detection electrodes.

4. The display apparatus with a touch detecting function according to claim 1, wherein
a boundary between the drive electrodes in the array direction overlaps a boundary between the pixel electrodes in the array direction.

5. The display apparatus with a touch detecting function according to claim 1, wherein, the plurality of drive electrodes in the drive electrode layer are arranged symmetrically with respect to a center in the array direction.

6. The display apparatus with a touch detecting function according to claim 1, wherein the display device performs line-sequential scan on each of horizontal lines in a display operation, and a boundary between the drive electrodes in the array direction overlaps a boundary between horizontal lines.

7. The display apparatus with a touch detecting function according to claim 1, wherein the first drive electrode, which has the first width greater than the second width and overlaps a frame area in which no pixel electrodes are disposed, has fringe electric field of intensity higher than intensity of the second drive electrode, the second drive electrode having the second width and being disposed in the display area in which pixel electrodes are disposed.

8. An electronic apparatus having a display apparatus with a touch detecting function that has a touch detection device and a display device arranged in a manner overlapping with the touch detection device, the display apparatus comprising:
an array substrate;
an opposed substrate opposed to the array substrate;
a display functional layer disposed between the array substrate and the opposed substrate;
a chip;
a first wire electrically connected to the chip;
a second wire extending in a direction different from the first wire;
a drive electrode layer that is disposed on the array substrate and includes a plurality of drive electrodes formed in stripes and arranged in an array direction, the drive electrodes including
 a first drive electrode that has a first width in the array direction, the first drive electrode being electrically coupled to corresponding second wires at both ends of the first drive electrode, and
 a second drive electrode having a second width in the array direction, the first width being greater than the second width, the second drive electrode being electrically coupled to corresponding second wires at both ends of the second drive electrode;
a plurality of pixel electrodes disposed on the plurality of drive electrodes via an insulation layer;
a plurality of touch detection electrodes that are arranged on an observer side of the opposed substrate in a manner facing the plurality of drive electrodes and generate capacitance with the plurality of drive electrodes; and
a touch detecting unit configured to detect a position of an object in contiguity with a touch detection area based on detection signals supplied from the plurality of touch detection electrodes,
wherein the first drive electrode is farther from the chip than the second drive electrode,
wherein the second width is an integral multiple of a pixel pitch that is an arrangement interval between the plurality of pixel electrodes in a display area, and
wherein a difference between the first width and the second width is an even integral multiple of the pixel pitch.

9. The electronic apparatus according to claim 8, wherein, the plurality of drive electrodes in the drive electrode layer are arranged symmetrically with respect to a center in the array direction.

* * * * *